United States Patent
Buracchini et al.

(10) Patent No.: US 9,031,550 B2
(45) Date of Patent: May 12, 2015

(54) METHOD FOR CONFIGURING A RADIO TERMINAL THROUGH A RADIO COMMUNICATION NETWORK, RELATED NETWORK AND COMPUTER PROGRAM PRODUCT THEREFOR

(75) Inventors: Enrico Buracchini, Turin (IT); Paolo Goria, Turin (IT); Alessandro Trogolo, Turin (IT)

(73) Assignee: Telecom Italia S.p.A., Milan (IT)

( * ) Notice: Subject to any disclaimer, the term of this patent is extended or adjusted under 35 U.S.C. 154(b) by 1650 days.

(21) Appl. No.: 11/666,508

(22) PCT Filed: Oct. 28, 2004

(86) PCT No.: PCT/EP2004/012165
§ 371 (c)(1),
(2), (4) Date: Apr. 27, 2007

(87) PCT Pub. No.: WO2006/045334
PCT Pub. Date: May 4, 2006

(65) Prior Publication Data
US 2009/0067367 A1    Mar. 12, 2009

(51) Int. Cl.
*G06F 15/16*   (2006.01)
*H04W 8/24*    (2009.01)
(Continued)

(52) U.S. Cl.
CPC ............... *H04W 8/245* (2013.01); *H04W 8/22* (2013.01); *H04W 88/06* (2013.01)
USPC ........................... 455/419; 455/418; 709/249

(58) Field of Classification Search
CPC ...... H04W 36/14; H04W 88/06; H04W 8/245
USPC .......................................... 370/329; 709/249
See application file for complete search history.

(56) References Cited

U.S. PATENT DOCUMENTS 6,463,055 B1   10/2002   Lupien et al.
6,577,614 B1    6/2003   Cook et al.
(Continued)

FOREIGN PATENT DOCUMENTS

EP    0 852 448 A1    8/1998
EP    1 128 691 A2    8/2001
(Continued)

OTHER PUBLICATIONS

Yoshida et al.; "Radio System, Method for Downloading Software and Radio Terminal," Patent Abstract of Japan, of JP-2001061186 A, published Mar. 6, 2001, 1 Sheet.
(Continued)

*Primary Examiner* — Charles Appiah
*Assistant Examiner* — Edward Zhang
(74) *Attorney, Agent, or Firm* — Finnegan, Henderson, Farabow, Garrett & Dunner, L.L.P.

(57) ABSTRACT

A method for configuring a re-configurable radio terminal through a communication network operating according to a communication system, wherein the radio terminal is configured for exchanging information with at least one node of the communication network by using the communicating system. The method is characterized by the steps of associating with the one node of the communication network a server entity configured for using a protocol layer of the communication system and including a set of operating software modules for configuring the radio terminal with at least one set of elements of protocol stack suitable to reconfigure the radio terminal; associating with the radio terminal a client entity configured for using a respective protocol layer corresponding to the protocol layer of the server entity, establishing an over-the-air connection between the radio terminal and the server entity by using the protocol layer, and downloading at least one module of the set of operating software modules from the server to the radio terminal configuring at least in part the radio terminal.

25 Claims, 11 Drawing Sheets

(51) Int. Cl.
*H04W 8/22* (2009.01)
*H04W 88/06* (2009.01)

(56) References Cited

U.S. PATENT DOCUMENTS

| | | | |
|---|---|---|---|
| 6,751,227 B1 * | 6/2004 | Ahmavaara et al. | 370/410 |
| 6,799,203 B2 | 9/2004 | Oommen | |
| 7,035,932 B1 * | 4/2006 | Dowling | 709/230 |
| 2002/0012329 A1 * | 1/2002 | Atkinson et al. | 370/330 |
| 2002/0085568 A1 | 7/2002 | Oommen | |
| 2003/0035386 A1 * | 2/2003 | Sullivan | 370/316 |
| 2003/0036387 A1 * | 2/2003 | Kovacs et al. | 455/442 |
| 2003/0084165 A1 * | 5/2003 | Kjellberg et al. | 709/227 |
| 2003/0163551 A1 | 8/2003 | Riordan | |
| 2004/0049561 A1 * | 3/2004 | Tafazolli et al. | 709/220 |
| 2004/0072563 A1 | 4/2004 | Holcman et al. | |
| 2004/0073901 A1 * | 4/2004 | Imamatsu | 717/170 |
| 2004/0098715 A1 | 5/2004 | Aghera et al. | |
| 2004/0120281 A1 | 6/2004 | Gazzard | |
| 2004/0147262 A1 | 7/2004 | Lescuyer et al. | |
| 2004/0176129 A1 | 9/2004 | Menon et al. | |
| 2005/0007988 A1 | 1/2005 | Ferris et al. | |
| 2005/0027789 A1 | 2/2005 | Luo et al. | |
| 2005/0033829 A1 * | 2/2005 | Oommen | 709/220 |
| 2006/0020950 A1 * | 1/2006 | Ladd et al. | 719/328 |
| 2006/0130053 A1 | 6/2006 | Buljore et al. | |

FOREIGN PATENT DOCUMENTS

| | | | | |
|---|---|---|---|---|
| JP | 11-346186 | | 12/1999 | |
| JP | 2001-186074 | | 7/2001 | |
| WO | WO-02/058421 A1 | | 7/2002 | |
| WO | WO 02058421 A1 | * | 7/2002 | |
| WO | WO-03/039175 A1 | | 5/2003 | |
| WO | WO-2006/045334 A1 | | 5/2006 | |
| WO | WO-2006/045335 A1 | | 5/2006 | |
| WO | WO 2007057031 A1 | * | 5/2007 | H04L 29/06 |

OTHER PUBLICATIONS

Luo et al.; "Design of Software Download Management for Reconfigurable Terminals in WCDMA Systems," IEEE 2002 International Conference on Jun. 29-Jul. 1, 2002, vol. 1, pp. 182-186, (2002).

Mehta et al.; "Reconfigurable Terminals: An Overview of Architectural Solutions," IEEE Communications Magazine, vol. 39, No. 8, pp. 82/89, (Aug. 2001).

Mitola; "The Software Radio Architecture," IEEE Communications Magazine, pp. 26-38, (May 1995).

Buracchini; "The Software Radio Concept," IEEE Communications Magazine, pp. 138-143, (Sep. 2000).

Olaziregi et al.; "Architecture of IP Based Network Elements Supporting Reconfigurable Terminals," Scout Workshop, 7 pages, (Sep. 16, 2003).

3GPP; "$3^{rd}$ Generation Partnership Project; Technical Specification Group Services and System Aspects; Multimedia Broadcast/Multicast Service (MBMS); Architecture and Functional Description (Release 6)," 3GPP TS 23.246 v.6.4.0, pp. 1-42, (2004).

SDR Forum; "Requirements for Radio Software Download for RF Reconfiguration," SDRF-02-A-0007-V0.0, pp. 1-2 and 8-11, (2002).

Arnot et al.; "Software Radio: The Challenges for Reconfigurable Terminals"; Annals of Telecommunications, pp. 1-35, (Jul./Aug. 2002).

Micocci et al.; "Requirements on Network and Security Architecture and Traffic Management Schemes for Download Traffic Based on IP Principles in Cellular and Ad Hoc Networks," IST-2001-34091 Scout, D 4.1.1, pp. 1-136, (Oct. 31, 2002).

Office Action in Japan for counterpart application JP 538272-2007, dated Apr. 7, 2010.

Hiroyuki Shiba et al., "Design and Evaluation of Software Radio Prototype with Over-the-Air Download Function," Vehicular Technology Conference, 2001, VTC 2001 Fall, IEEE VTS $54^{th}$, pp. 2466-2469, vol. 4, Atlantic City, NJ.

Luo Zhigang et al., "A Multi-Standard SDR Base Band Platform," Computer Networks and Mobile Computing, ICCNMC 2003, 2003 International Conference, Oct. 20-23, 2003; pp. 461-464.

SDR (Software Defined Radio) Forum, "Requirements for Radio Software Download for RF Reconfiguration," SDRF-02-S-007-V1.0.0, Nov. 13, 2002, pp. 1-41.

Office Action mailed Nov. 20.2009, in U.S. Appl. No. 11/666,439.

English-language translation of Notice of Reason for Rejection issued by Japan Patent Office on Sep. 28, 2012 in corresponding Application No. JP 2011-172398 (3 pages).

* cited by examiner

METHOD FOR CONFIGURING A RADIO TERMINAL THROUGH A RADIO COMMUNICATION NETWORK, RELATED NETWORK AND COMPUTER PROGRAM PRODUCT THEREFOR

CROSS REFERENCE TO RELATED APPLICATION

This application is a national phase application based on PCT/EP2004/012165, filed Oct. 28, 2004, the content of which is incorporated herein by reference.

FIELD OF INVENTION

The present invention relates in general to radio communication networks and to reconfigurable radio terminals using a radio communication network.

More particularly, the present invention concerns the reconfiguration of a radio terminal, said reconfiguration being carried out by installing in said radio terminal an operating software downloaded over the air (OTA) from the radio communication network.

BACKGROUND OF INVENTION

It is known from the literature (J. Mitola, "The Software Radio Architecture", IEEE Communications Magazine, May 1995 and E. Buracchini, "The Software Radio Concept", IEEE Communications Magazine, September 2000) that reconfigurable systems like terminals, base stations and network nodes, are equipments whose operative working mode may be reconfigured. For instance, a reconfigurable radio terminal able to work with a second generation system (2G), like GSM/GPRS (Global System for Mobile Communication/General Packet Radio Service), can be reconfigured in order to become able to work with a third generation system (3G), like UMTS (Universal Mobile Telecommunication System) or CDMA 2000 (Code Division Multiple Access 2000), with DVB-T (Digital Video Broadcasting Terrestrial) or with WLAN (Wireless Local Area Network) systems and so on. According to present disclosure, the term "system" is intended as a plurality of elements coordinated between them according to predetermined criteria, that is coordinated according to a "Standard", in order to perform a specific function which is for instance that of operating as a communication network.

In the present document, examples of systems are the GSM system, the GPRS system, the UMTS system, the WLAN system and so on, each of them complying with a corresponding Standard.

In order to carry out the reconfiguration of a terminal, it is necessary—according to the above mentioned literature—that the operative functions of the terminal are realised with a technology which is reconfigurable. Concerning this, the reconfigurable terminals or devices are provided with a reprogrammable hardware constituted, for example, by a plurality of FPGAs (Field Programmable Gate Arrays), DSPs (Digital Signal Processors) and microprocessors: the single functionalities of the device, even at the lowest level, are performed by a software code. As a consequence, for reconfiguring a reprogrammable device, it suffices to replace the operating software managing the hardware of the device itself.

By the term "operating software" it is meant, in present description, the software, organised in libraries, which defines both the radio interface (e.g. L1, L2, L3) and the upper layers (e.g. L4 up to L7) of the protocol stack of a considered system, like for instance GSM/GPRS, UMTS and so on.

As known, in the telecommunication domain, the most employed method for obtaining a functional grouping is the OSI model (Open System Interconnection). The functionalities are grouped in functional planes represented under the form of a stack.

Each layer of the protocol stack provides services to the immediately higher layer, said services being in turn improvements of the services provided by the immediately lower layer.

The lowest layer (layer 1) is generally intended for physically transmitting the information.

According to the OSI specification, the standard number of layers is 7: respectively physical, connection, network, transport, session, presentation and application layer.

Each system, e.g. GSM/GPRS, UMTS and so on, implements the necessary part of the OSI protocol stack.

When considering a radio terminal, the benefits provided when using a reconfigurable hardware are many, but one benefit is evidently immediate: the radio terminal can be reconfigured according to the system covering the area where the terminal is located (working area). Therefore, if the terminal is used in an area covered by a second generation system, like GSM/GPRS, the terminal can be reconfigured in order to be able to receive said system; likewise, in an area covered by a third generation system, like UMTS, the terminal can be configured accordingly.

It is known from the literature (AA.VV. "Software Radio: The Challenges for Reconfigurable Terminals", Annals of telecommunications—July/August 2002, GET Hermes and E. Buracchini "The Software Radio Concept") that a software code may be transferred or downloaded to a terminal at least in three different ways:
  via a smart card by using a SIM (Subscriber Identity Module) to be inserted inside the radio mobile terminal;
  via an external connection by using for instance a link with a personal computer through an infrared/serial/USB (Universal Serial Bus) port;
  via radio or over-the-air (OTA) by using a specific radio channel.

Concerning software downloading, the fundamental steps of a generic protocol allowing to manage the downloading of a software to a terminal have been defined in the framework of the Software Defined Radio Forum (SDR Forum) as reachable via the URL www.sdrforum.org.

The protocol as defined by SDRF is of the client-server type, per se known.

The downloading protocol steps are the following ones:
  download initiation: step during which the terminal communicates to the server, on which a software to be downloaded is resident, the intention to begin a software download;
  mutual authentication; the terminal and the server must authenticate each other;
  capability exchange: the server communicates the capability information relative to the software to be downloaded and the terminal verifies whether the software can be loaded into the terminal memory, installed therein and run;
  download acceptance: the server communicates to the terminal the downloading, installation and billing options; the terminal decides whether the indications provided by the server are acceptable or not;

download and integrity test: during the software download, the received code must be tested; the terminal requests the retransmission of the incorrectly received radio blocks;

installation: during the installation step, the software billing and licensing conditions are provided by the server;

in-situ testing: before starting the software, the terminal carries out some tests with the help of test vectors downloaded together with the software code;

non repudiation exchange: once the software code has been installed and tested, the terminal confirms to the server that the installation was successful in order to start the billing procedure.

It is known from prior art, e.g. E. Buracchini, "The Software Radio Concept", IEEE Communications Magazine, September 2000, that the software downloading via radio or OTA foresees the use by the terminal of a radio channel. It is known—according to the above mentioned literature—to download the software code in two different ways, depending on the typology of the radio channel:

"out of band" way: by means of a "universal" channel independent from the current system, when the terminal is switched on, it automatically tunes to said channel and performs the download of the operating software relative to the system operating in the working area;

"in band" way: by using the radio channels of the standard cellular systems of second and third generation, like GSM/GPRS and UMTS respectively, this way provides that the terminal, already operating on one of these channels, can receives the operating software relative to a system different from that currently used; for instance, a reconfigurable terminal operating with a second generation system, like GSM/GPRS, can perform the download of a third generation system, like UMTS, by using the second generation radio channel according to which it is working.

An example of "out of band" software download is for instance described in the Japanese Patent Application No. 2001061186. This document describes a system and a method for downloading software content over-the-air. When a radio terminal is switched on, it seeks on an universal channel what the current system in the working area is and carries out the software download relative to the indicated system.

Considering the "out of band" mode, according to prior art, it is needed to implement a dedicated radio channel and therefore dedicated equipments in the network for its implementation.

An example of "in band" software download is for instance described in the US Patent Application No. 2003/0163551. This document describes a system and a method for downloading software over-the-air by using dedicated channels during the negotiation steps between server and terminal (capability exchange, authentication, billing and so on), and by using shared common channels during the download procedure in order to provide the download service to as many users as possible simultaneously, without imposing a handicap on the available radio resources.

When considering the "in band" download way, the documents AA.VV., "Architecture Of IP Based Network Elements Supporting Reconfigurable Terminals", SCOUT Workshop, 16 Sep. 2003, and IST-2001-34091 SCOUT, D4.1.1 "Requirements on network and security architecture and traffic management schemes for download traffic based on IP principles in cellular and ad hoc networks" suggest to modify deeply some protocols and some network nodes, e.g. the radio access nodes and/or Core Networks nodes based on release 5 and followings of UMTS, wherein the Core Network is completely based on IP (Internet Protocol), in order to make it possible to manage the download of the operating software.

Such modifications imply a considerable effort for the equipment manufacturers and for the network operators and dramatically impact on the Standards of the existing cellular systems.

Therefore the known "in band" techniques exhibit the limit that, when it is desired to add to an already existing cellular network, like for instance GSM/GPRS or UMTS, the operating software download management for reconfigurable terminals, heavy modifications to the protocols and to the network nodes are necessary.

Applicant notes that known prior art both in case of "in band" way and "out of band" way provides for deeply modifying some protocols and some network nodes.

A further problem of the known prior art is the management of the inter-system hand-over, that according to the present Standard, is defined as:

hand-over from a GSM/GPRS system to a UMTS system;
hand-over from a UMTS system to a CDMA 2000 system;
hand-over from a UMTS system to a GSM/GPRS system;
hand-over from a CDMA 2000 system to a UMTS system.

According to the known standard the inter-system hand-over requires multimode terminals, i.e. terminals supporting the whole protocol stack of each cellular system by using ASIC (Application Specific Integrated Circuit) technology. See, for example, FIG. 1 showing a multimode terminal comprising a whole radio protocol stack of the GSM/GPRS system referenced as RAT GSM/GPRS, a whole radio protocol stack of the UMTS system referenced as RAT UMTS, and a whole radio protocol stack of the CDMA 2000 system referenced as RAT CDMA 2000.

The known solution has some disadvantages as high power consumption, big device size and high implementation costs.

In summary, Applicant notes that known prior art
does not solve the problem of downloading software without a huge modification of the network nodes, e.g. the addition of new nodes and interfaces, and to modify the data signalling and transferring protocols defined by the Standard, which could imply an inefficient use of the radio resources; and
is not able to use re-configurable terminals for managing inter system handover.

SUMMARY OF INVENTION

It is therefore an object of the present invention a method and a communication network for the download of an operating software for configuring a radio terminal without a huge modification of the network nodes and related protocols.

Moreover, it is a further object of present invention a method and a communication network for enabling inter-system hand-over procedures by using configurable terminals.

The above objects are achieved through a method and a communication network as claimed in the hereby attached claims.

Moreover, the objects of the present invention are achieved through a computer program product or a set of computer program products, loadable in the memory of at least one computer and including software code portions for performing the steps of the method of the invention when the product is run on a computer as claimed. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed modular fashion.

In a preferred embodiment, the downloading of the operating software for reconfiguring the radio terminal is achieved by providing to modify, solely, one layer of the radio protocol stack in the terminal and in at least one node of the network with respect to the Standard, for example in a radio controller like a BSC (Base Station Controller) or a RNC (Radio Network Controller) of the network. According to the invention, the protocol in the modified layer is coherent with the recommendations provided by the SDR Forum.

According to a preferred embodiment of the invention, the Server, from which it is possible to download the operating software, resides in the radio controller, e.g. BSC or RNC, of the network.

Among the possible advantages of the invention:
the software download service is transparent and is viewed by the network as any other signalling and traffic data flow;
all the features of the existing and future Standards are fully exploited, thereby allowing an effective and flexible use of the radio resources;
it is possible, for example, during a circuit call, to establish a packet connection in order to download the operating software without interrupting the call;
it is possible to distinguish between different data flows and to manage the priority of them (e.g. voice, data and software download); For example, if the priority of the voice calls is greater than the priority of the software download, it is possible to break temporarily the download of the software itself for resuming said download successively.

Moreover, the invention provides for the use of reconfigurable terminals for managing inter system handover.

In fact, according to the preferred embodiment of the invention, it is sufficient that only the minimal functionalities for carrying out measurements on the supported systems are implemented at physical layer of the terminal.

For example, let us consider a terminal configured for operating with the GSM/GPRS system and ready to manage inter system handover to the UMTS system: according to the present invention, the terminal, configured with the whole protocol stack of the radio interface of the GSM/GPRS system, is provided with only the minimal physical layer functionalities in order to perform the power measurements on the UMTS system.

The inter-system handover is managed by downloading the full UMTS operating software via a GSM/GPRS radio channel into the terminal and by reconfiguring the terminal according to the UMTS system and by providing the minimal physical layer functionalities in order to perform the power measurements on the GSM/GPRS system.

BRIEF DESCRIPTION OF THE DRAWINGS

The invention will be now disclosed hereinbelow with reference to the attached drawings of preferred but non limiting embodiments thereof, in which.

Throughout all the Figures the same references have been used to indicate components that are equal or implement substantially equivalent functions.

DETAILED DESCRIPTION OF THE INVENTION

Figure 1:
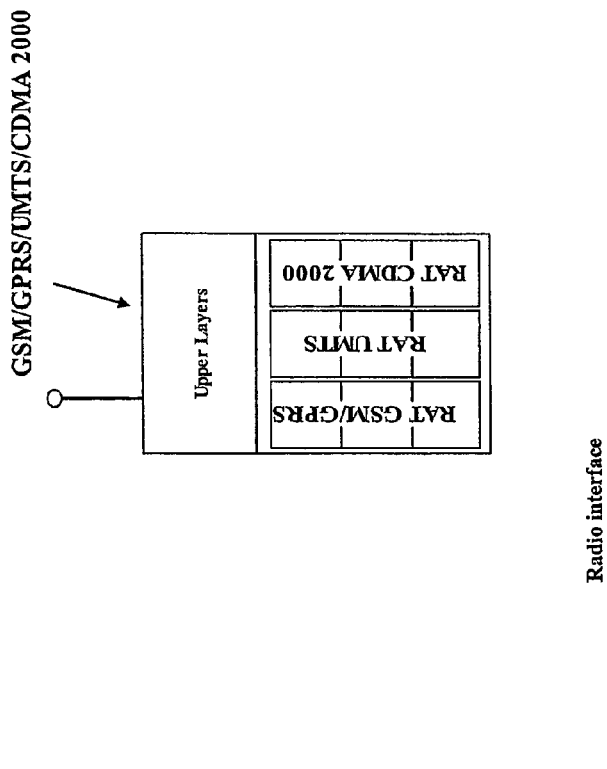
FIG. 1 represents a multi-mode terminal according to prior art.
Figure 2:
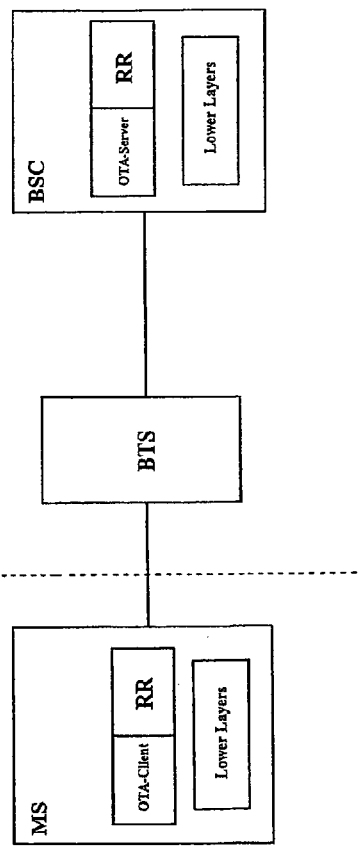
FIG. 2 illustrates the architecture of a network of the GSM/GPRS system, according to one embodiment of present invention.

With reference to FIG. 2, it is shown the architecture of a network of the GSM/GPRS system comprising a re-configurable terminal or mobile station MS, a base transceiver station BTS or BTS node and a base station controller BSC or BSC node.

The network further comprises, for example, core network nodes, such as Mobile switching Centres (MSC) and/or Serving GPRS Support Nodes (SGSN) and/or Gateway GPRS Support Nodes (GGSN), not evidenced in FIG. 2.

The terminal MS is connected through a radio interface to the BTS node which is connected to the BSC node.

According to the preferred embodiment of the invention the terminal MS, comprises a first entity referenced as OTA-Client and a second entity, of known type, referenced as radio resource protocol RR; the OTA-Client is at the same protocol level or layer and co-operates with the radio resource protocol RR.

The RR entity works, for example, according to GSM/GPRS standard ETSI 04.18 and comprises functionalities, as will be disclosed later on, for communicating with the OTA-Client and a RR corresponding entity in the base station controller BSC. The OTA-Client comprises a software module able to completely manage the download procedure of the complete operating software or part of it from a OTA corresponding entity in the base station controller BSC referenced as OTA server.

The BSC comprises a first entity referenced as OTA-server and a second entity, of known type, referenced as radio resource protocol RR.

The OTA-server is at the same protocol level and co-operates with the radio resource protocol RR.

The RR entity works, for example, according to GSM/GPRS standard ETSI 04.18 and comprises functionalities, as will be disclosed later on, for communicating with the OTA-server and the RR corresponding entity in the mobile terminal MS.

The OTA-server comprises a software module able to completely manage the download procedure of the complete operating software or a part of it to the OTA-Client.

The OTA-server further comprises the operating software or is able to recover it. The architecture of the OTA-Server provides a context called Client-Context for each OTA-Client that has an active download session, as will be disclosed later on.

Figure 3:
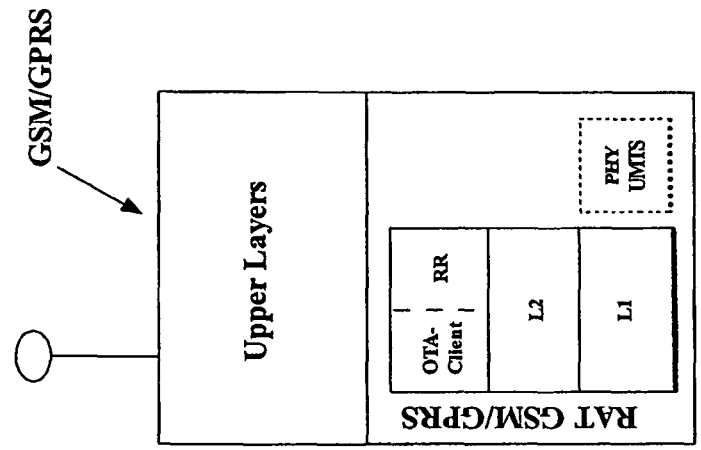
FIG. 3 represents a re-configurable terminal for the architecture of FIG. 1.

FIG. 3 shows an example of a terminal MS configured according to present invention.

The terminal MS comprises upper and lower layers of the GSM/GPRS protocol. The lower layers are referenced as RAT (Radio Access Technology) GSM/GPRS and comprise the entities OTA client, the radio resource RR and the physical (L1) and DL (Data Link) (L2) according to the GSM/GPRS standard.

The terminal MS further comprises a physical layer (L1U) according to a further standard, e.g. the UMTS standard, including at least functionalities for executing layer 1 measurements compliant to the further standard.

The terminal MS as disclosed is able to be reconfigured by downloading the operating software of a further standard as will be disclosed later on.

The operating software, as considered in the preferred embodiment of the invention, comprises a set of operating software modules, preferably a plurality of software modules for configuring the terminal MS according to a predetermined communication system.

The invention provides for the downloading of all operating software modules constituting a protocol stack employed in order to configure the radio terminal MS in accordance, for example, to a further predetermined communication system.

As a skilled person could understand, it is also possible, according to further embodiments of present invention, to download software modules constituting solely a part of the protocol stack corresponding to the communication system in use or the further communication system.

Such further embodiments could be useful with the aim, for example, of inserting new functionalities, updates or fixing bugs in the terminal MS.

Figure 4:
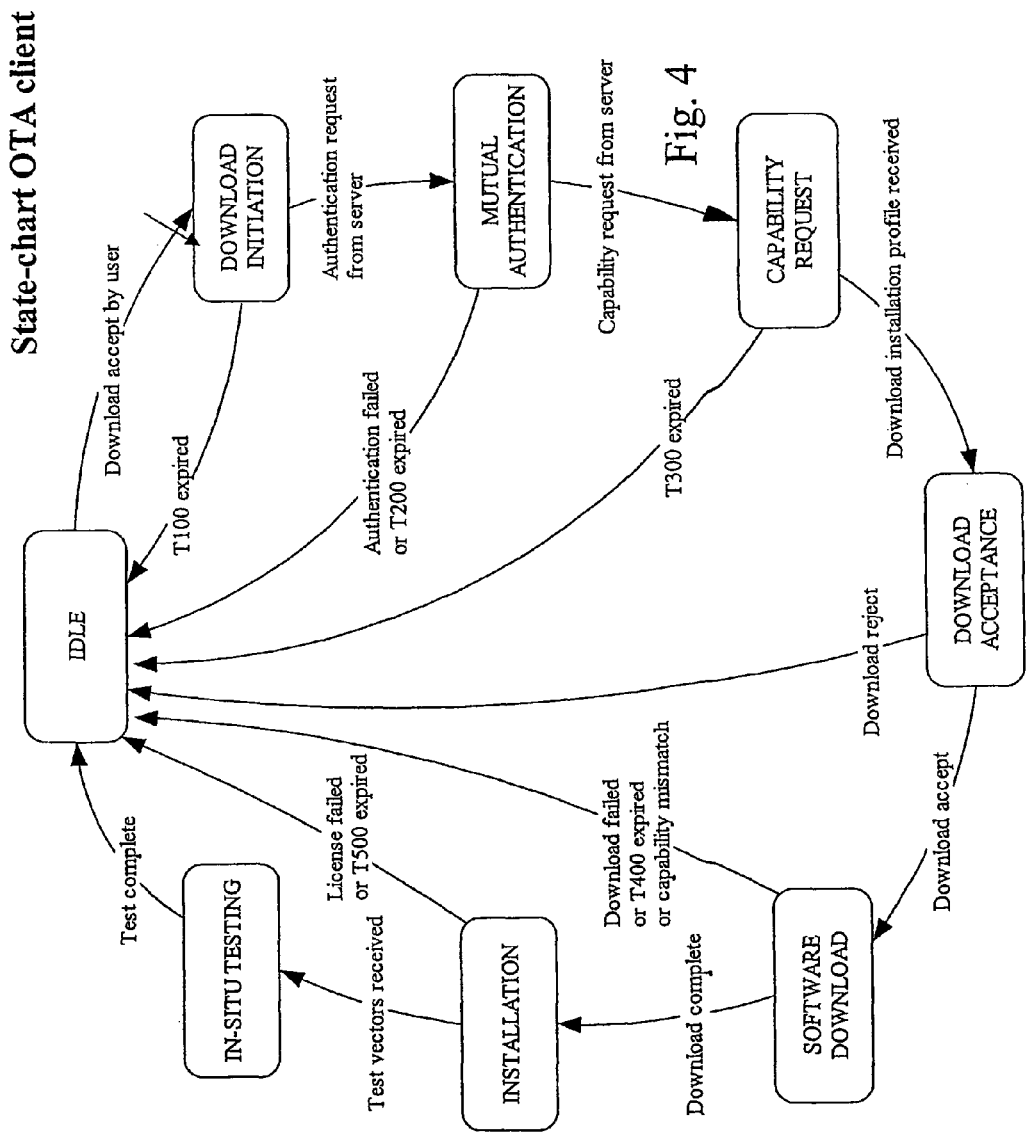
FIG. 4 is a state diagram of the protocol steps carried out by the client at the radio terminal side.

With reference to FIG. 4, it is represented the state diagram of the OTA-Client in the terminal MS.

The terms used for naming the states are purely indicative, as it is significant the corresponding behaviour as described.

According to a preferred embodiment of present invention, the states and the relative transitions of the OTA-Client, are the followings:

state IDLE: the OTA-Client is in this state when no software download procedure is active; the OTA-Client returns to this state if the procedure is correctly terminated or if a failure occurs;

state DOWNLOAD INITIATION: when the network requires to start an operating software download procedure, the OTA-Client enters this state and starts a timer T100; the timer T100 is stopped in case of a state transition; if the timer T100 expires before a state transition, the OTA-Client returns to the state IDLE;

state MUTUAL AUTHENTICATION: in this state the OTA-Client performs the mutual authentication with the OTA-Server; the OTA-Client enters this state when an authentication request comes from the OTA-Server; the OTA-Client starts a timer T200; the timer T200 is stopped in case of a state transition; if the timer T200 expires before a state transition or the authentication fails, the OTA-Client returns to the state IDLE;

state CAPABILITY REQUEST: in this state the OTA-Client provides to the OTA-Server its capability; the OTA-Client enters this state when the OTA-Server requests its capability; the OTA-Client starts a timer T300; the timer T300 is stopped in case of a state transition; if the timer T300 expires before a state transition, the OTA-Client returns to the state IDLE;

state DOWNLOAD ACCEPTANCE: in this state the OTA-Client determines whether to continue the download according to the information received by the OTA-Server; the OTA-Client enters this state when it receives from the OTA-Server the download profile to be carried out; if the received profile is rejected, the OTA-Client returns to the state IDLE;

state SOFTWARE DOWNLOAD: in this state the OTA-Client performs the software download; the OTA-Client enters this state if the download profile is accepted; the OTA-Client starts a timer T400; the timer T400 is reset and restarted at each software block received from the OTA-Server; the timer T400 is stopped in case of a state transition; if the timer T400 expires before a state transition or the download fails or the downloaded software does not comply with the capability, the OTA-Client returns to the state IDLE;

state INSTALLATION: in this state the OTA-Client sends a request to the OTA-Server for a license and installs the operating software; the OTA-Client enters this state at the end of the download; the OTA-Client starts a timer T500; the timer T500 is stopped in case of a state change; if the timer T500 expires before a state change or the license is not accepted, the OTA-Client returns to the state IDLE;

state IN-SITU TESTING: in this state the OTA-Client performs some tests on the downloaded software by using some test vectors received by the OTA-Server; the OTA-Client enters this state when the operating software has been installed; once the tests have ended, the OTA-Client returns to the state IDLE.

Figure 5:
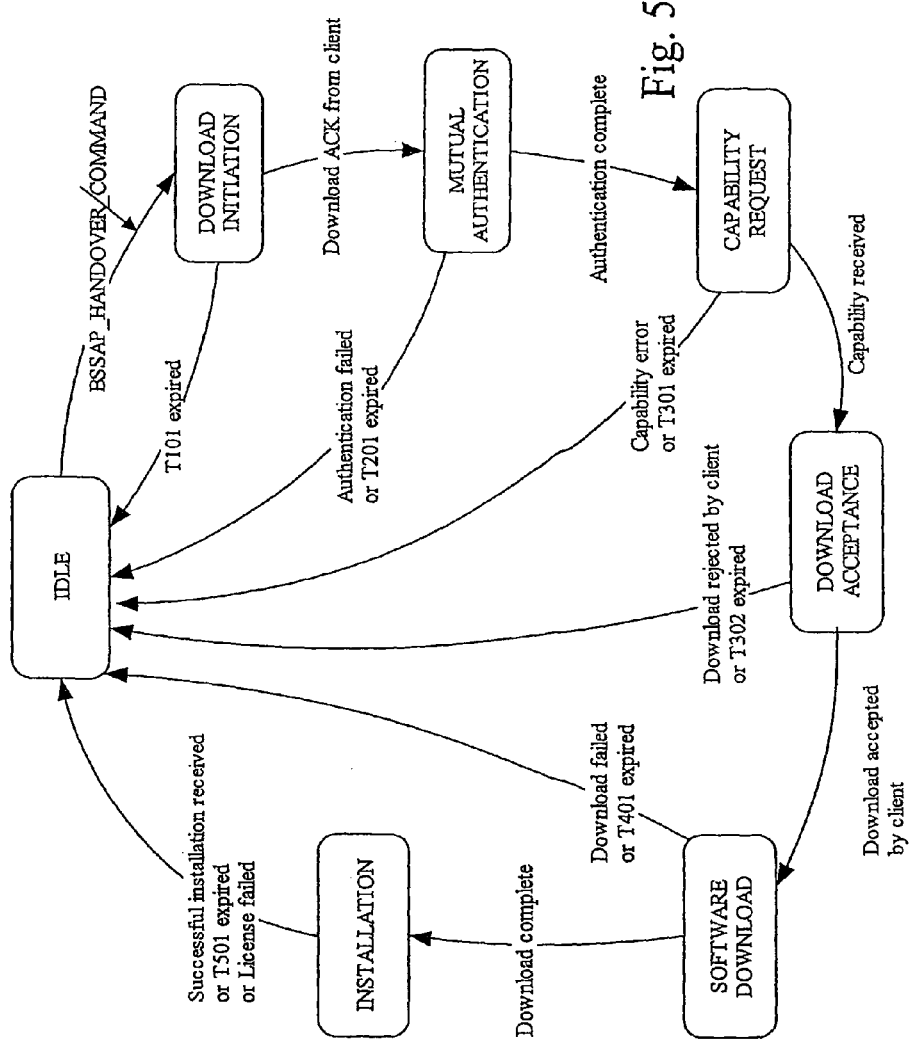
FIG. 5 is a state diagram of the protocol steps carried out by the server at the base station controller side.

With reference to FIG. 5, it is represented the state diagram of the Client-Context managed by the OTA Server.

As previously remarked, the terms used for naming the states are purely indicative, as it is significant the corresponding behaviour as described.

The states and the relative transitions of the Client-Context are the followings:

state IDLE: the OTA-Client-Context managed by the OTA-Server is in this state when no software download procedure is active; the OTA-Client-Context returns to this state if a procedure is correctly terminated or if a failure occurs;

state DOWNLOAD INITIATION: in this state the OTA-Client-Context triggers the OTA-Client to perform a download; when it is necessary to perform the download of the operating software, the OTA-Client-Context enters this state and starts a timer T101; the timer T101 is stopped before a state transition; if the timer T101 expires before a state transition, then the OTA-Client-Context returns to the state IDLE;

state MUTUAL AUTHENTICATION: in this state the OTA-Client-Context authenticates itself and requests the OTA-Client to identify itself; the OTA-Client-Context enters this state when it receives from the OTA-Client the download confirmation; the OTA-Client-Context starts a timer T201; the timer T201 is stopped in case of a state transition; if the timer T201 expires before a state transition or the authentication fails, the OTA-Client-Context returns to the state IDLE;

state CAPABILITY REQUEST: in this state the OTA-Client-Context requests to the OTA-Client its capability; the OTA-Client-Context enters this state when the authentication is completed; the OTA-Client-Context starts a timer T301; the timer T301 is stopped in case of a state transition; if the timer T301 expires before a state transition or the capability does not allow the download, the OTA-Client-Context returns to the state IDLE;

state DOWNLOAD ACCEPTANCE: in this state the OTA-Client-Context communicates to the OTA-Client the download profile; the OTA-Client-Context enters this state when it receives the terminal capability and said capability is accepted; the OTA-Client-Context starts a timer T302; the timer T302 is stopped in case of a state transition; if the timer T302 expires before a state transition or the OTA-Client rejects the proposed download, the OTA-Client-Context retu rns to the state IDLE;

state SOFTWARE DOWNLOAD: in this state the OTA-Client-Context performs the download of the software towards the OTA-Client; the OTA-Client-Context enters this state if the download profile is accepted by the OTA-Client; the OTA-Client-Context starts a timer T401; the timer T401 is reset and restarted at each acknowledgement signal Ack received from the client; the timer T401 is stopped in case of a state transition; if the timer T401 expires before a state transition or the download fails, the OTA-Client-Context returns to the state IDLE;

state INSTALLATION: in this state the OTA-Client-Context communicates to the OTA-Client the terms of the license and waits until the OTA-Client performs the installation and the tests of the downloaded software; the OTA-Client-Context enters this state when the download has ended; the OTA-Client-Context starts a timer T501; the timer T501 is stopped in case of a state transition; if the timer T501 expires before a state transition or the license has not been accepted by the OTA-Client, the OTA-Client-Context returns to the state IDLE; if the OTA-Client-Context receives an acknowledgement signal concerning the successful installation by the OTA-Client, it returns to the state IDLE.

In the case of GSM/GPRS, in the preferred embodiment of the invention, the RR protocol is modified by introducing new protocol messages and related fields exchanged between the OTA-Server and the OTA-Client which will be now described in detail with reference to the FIGS. 6-17.

In case of different systems the radio resource protocol, for example the RRC (Radio Resource Control) in the UMTS system, are modified in a similar way, as could be understandable by a skilled person.

Figure 6:
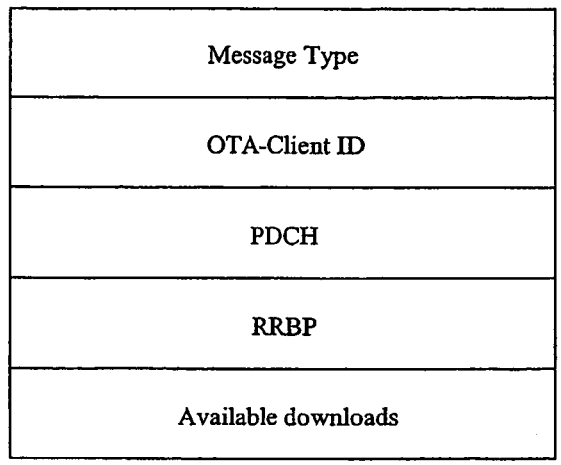
FIG. 6 to 17 illustrate the structure of the protocol messages exchanged between the server and the client.

In the following, the terms used for naming the messages and related fields are purely indicative, as it is significant the corresponding definition as described. With reference to FIG. 6, it is described the structure of the message Packet Download Request. This message is sent from the radio resource RR at the base station controller BSC side to the radio resource RR at the terminal MS side. Using this message the OTA-Server instructs the OTA-Client to begin a download session.

The fields provided, in the case of GSM/GPRS, are at least a set of the following ones:
Message_Type: identifies the sent message type (Packet Download Request);
OTA-Client_ID: identifies the OTA-Client towards which the request is performed;
PDCH (Packet Data Channel): specifies the channels allocated by the network on which the software download will be performed;
RRBP (Relative Reserved Block Period): specifies the radio block on which the radio resource RR at the terminal MS side shall answer, as already defined in the standard GPRS;
Requested Download: this element contains a description string and a numerical identifier of the requested download by the network.

Figure 7:
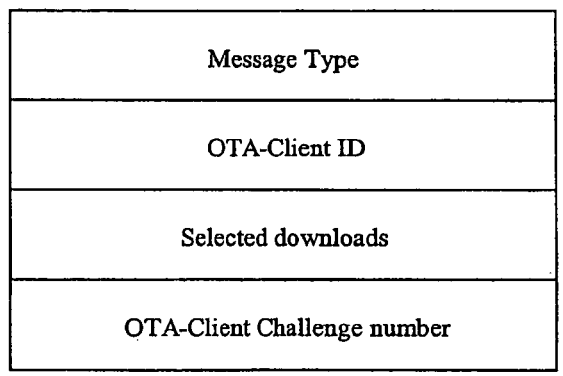

With reference to the FIG. 7, it is described the structure of the message Packet Download Ack. This message is sent from the OTA-Client to the OTA-Server. Using this message the OTA-Client communicates to the OTA-Server the confirmation to begin a download session.

The fields provided, in the case of GSM/GPRS, are at least a set of the following ones:
Message_Type: identifies the sent message type (Packet Download Ack);
OTA-Client_ID: identifies the OTA-Client sending the message;
OTA-Client_Challenge_Number: is a random number that the OTA-Server will encrypt with its own key and a suitable ciphering algorithm, for instance AES algorithm (Advanced Encryption Standard), in order to perform the first step of the mutual authentication.

Figure 8:
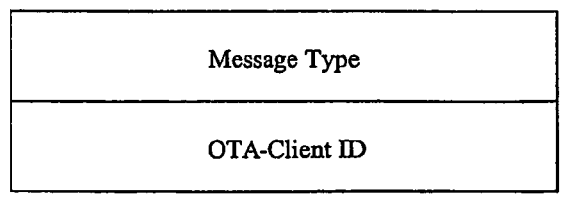

With reference to FIG. 8, it is described the structure of the message Packet Download Nack. This message is sent from the OTA-Client to the OTA-Server. Using this message the OTA-Client communicates to the OTA-Server that it can not begin a download session.

The fields provided, in the case of GSM/GPRS, are at least a set of the following ones:
Message_Type: identifies the sent message type (Packet Download Nack);
OTA-Client_ID: identifies the OTA-Client sending the message.

Figure 9:
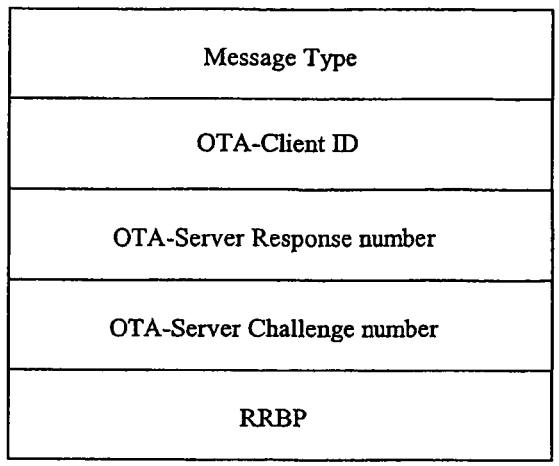

With reference to FIG. 9, it is described the structure of the Packet Authentication Request message. This message is sent from the OTA-Server to the OTA-Client. Using this message the OTA-Server communicates its credentials to the OTA-Client and requires that the OTA-Client identifies itself. The fields provided, in the case of GSM/GPRS, are at least a set of the following ones:
Message_Type: identifies the sent message type (Packet Authentication Request);
OTA-Client_ID: identifies the OTA-Client to which the message is sent;
OTA-Server_Response_Number: is a number encrypted by the OTA-Server with its own key and a suitable ciphering algorithm, like for instance AES algorithm, concluding the first step of the mutual authentication;
OTA-Server_Challenge_Number: is a random number that the OTA-Client will encrypt with its own key and a suitable ciphering algorithm, like for instance AES algorithm, in order to perform the second step of the mutual authentication;
RRBP: specifies the radio block on which the radio resource RR at the terminal MS side shall answer, as already defined in the standard GPRS.

Figure 10:
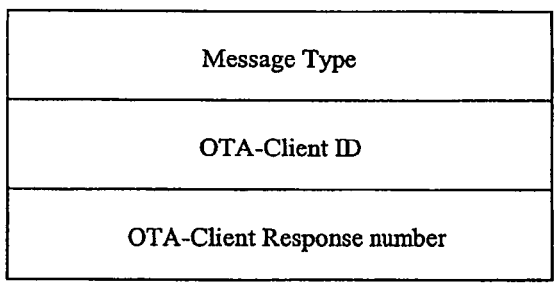

With reference to FIG. 10, it is described the structure of the message Packet Authentication Response. This message is sent from the OTA-Client to the OTA-Server. Using this message the OTA-Client communicates its credentials to the OTA-Server, having already authenticated the OTA-Server. The fields provided, in the case of GSM/GPRS, are at least a set of the following ones:
Message_Type: identifies the sent message type (Packet Authentication Response);
OTA-Client_ID: identifies the OTA-Client sending the message;
OTA-Client_Response_Number: identifies a number encrypted by the OTA-Client with its own key and a suitable ciphering algorithm, like for instance AES algorithm, concluding the second and last step of the mutual authentication.

Figure 11:
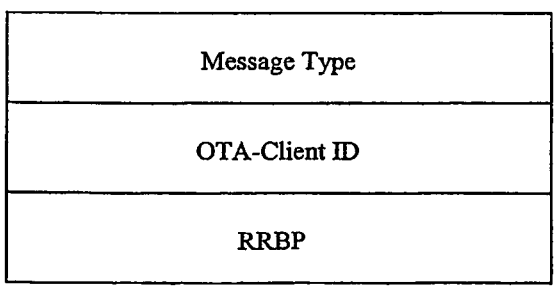

With reference to FIG. 11, it is described the structure of the message Packet Capability Request. This message is sent from the OTA-Server to the OTA-Client. Using this message the OTA-Server requests to the OTA-Client its reconfigurability options. The fields provided, in the case of GSM/GPRS, are at least a set of the following ones:

Message_Type: identifies the sent message type (Packet Capability Request);
OTA-Client_ID: identifies the OTA-Client to which the message is sent;
RRBP: specifies the radio block on which the radio resource RR at the terminal MS side shall answer, as already defined in the standard GPRS.

Figure 12:
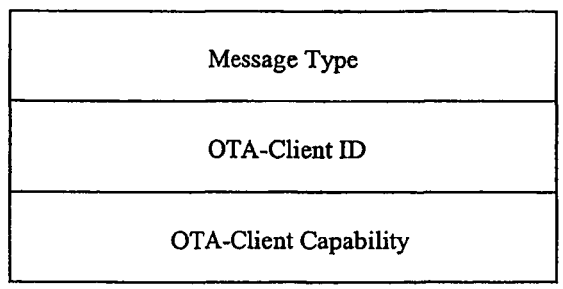

With reference to FIG. 12, it is described the structure of the message Packet Capability Response. This message is sent from the OTA-Client to the OTA-Server. Using this message the OTA-Client informs the OTA-Server about its reconfigurability options. The fields provided, in the case of GSM/GPRS, are at least a set of the following ones:
Message_Type: identifies the sent message type (Packet Capability Response);
OTA-Client ID: identifies the OTA-Client sending the message;
OTA-Client_Capability: describes the terminal reconfigurability options.

Figure 13:
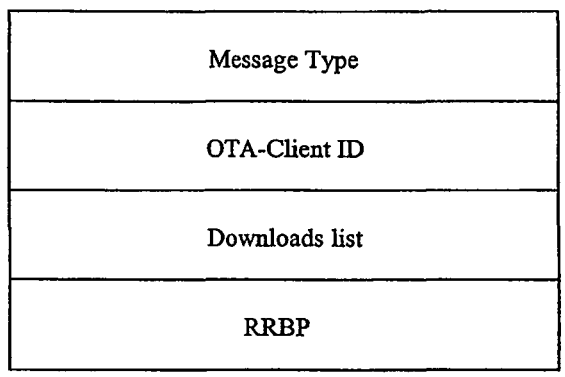

With reference to FIG. 13, it is described the structure of the message Packet Download Description. This message is sent from the OTA-Server to the OTA-Client. Using this message the OTA-Server reports to the OTA-Client the data relative to the download. The fields provided, in the case of GSM/GPRS, are at least a set of the following ones:
Message_Type: identifies the sent message type (Packet Download Description);
OTA-Client_ID: identifies the OTA-Client to which the message is sent;
Downloads_list: comprises one element for each download selected by the OTA-Client, said field including the following fields:
Download_Block_Number: is the number of radio blocks into which the operating software will be segmented before being transmitted to the OTA-Client;
Billing_criteria: are the criteria concerning the possible download billing;
Installation_criteria: are the criteria concerning the software installation.
RRBP: specifies the radio block on which the radio resource RR at the terminal MS side shall answer, as already defined in the standard GPRS.

Again with reference to FIG. 8, it is described the structure of the message Packet Download Accept. This message is sent from the OTA-Client to the OTA-Server. Using this message the OTA-Client confirms download.

The fields provided, in the case of GSM/GPRS, are at least a set of the following ones:
Message_Type: identifies the sent message type (Packet Download Accept);
OTA-Client_ID: identifies the OTA-Client sending the message.

Again with reference to FIG. 8, it is described the structure of the message Packet Download Reject. This message is sent from the OTA-Client to the OTA-Server. Using this message the OTA-Client rejects the download. The fields provided, in the case of GSM/GPRS, are at least a set of the following ones:
Message_Type: identifies the sent message type (Packet Download Reject);
OTA-Client_ID: identifies the OTA-Client sending the message.

Again with reference to FIG. 8, it is described the structure of the message Packet License Request. This message is sent from the OTA-Client to the OTA-Server. Using this message the OTA-Client requests to the OTA-Server the key for decrypting the downloaded operating software and for installing it. The fields provided, in the case of GSM/GPRS, are at least a set of the following ones:
Message_Type: identifies the sent message type (Packet License Request);
OTA-Client_ID: identifies the OTA-Client sending the message.

Figure 14:
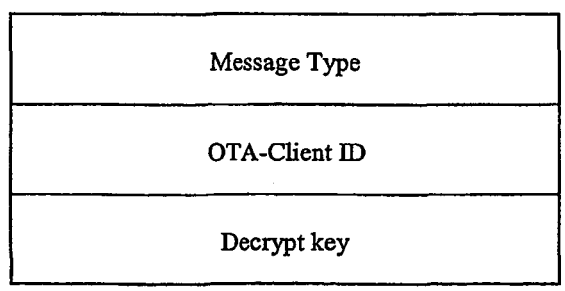

With reference to FIG. 14, it is described the structure of the message Packet License Response. This message is sent from the OTA-Server to the OTA-Client. Using this message the OTA-Server communicates to the OTA-Client the key for decrypting the downloaded operating software and for installing it. The fields provided, in the case of GSM/GPRS, are at least a set of the following ones:
Message_Type: identifies the sent message type (Packet License Response);
OTA-Client_ID: identifies the OTA-Client to which the message is sent;
Decrypt_key: is the key used for decrypting the operating software.

Again with reference to FIG. 8, it is described the structure of the message Packet License Accept. This message is sent from the OTA-Client to the OTA-Server. Using this message the OTA-Client indicates to the OTA-Server that the downloaded operating software has been correctly decrypted. The fields provided, in the case of GSM/GPRS, are at least a set of the following ones:
Message_Type: identifies the sent message type (Packet License Accept);
OTA-Client_ID: identifies the OTA-Client sending the message.

Again with reference to FIG. 8, it is described the structure of the message Packet License Failed. This message is sent from the OTA-Client to the OTA-Server. Using this message the OTA-Client informs the OTA-Server that the downloaded operating software has not been correctly decrypted. The fields provided, in the case of GSM/GPRS, are at least a set of the following ones:
Message_Type: identifies the sent message type (Packet License Failed);
OTA-Client_ID: identifies the OTA-Client sending the message.

Figure 15:
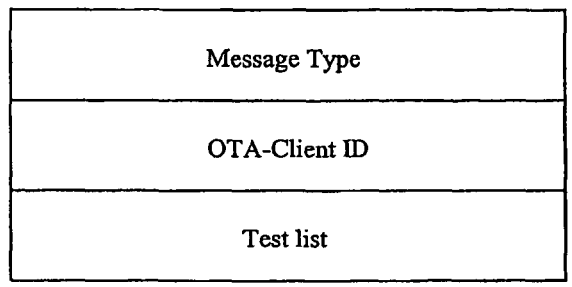

With reference to FIG. 15, it is described the structure of the message Packet Test Description. This message is sent from the OTA-Server to the OTA-Client. Using this message the OTA-Server indicates to the OTA-Client the tests to be performed on the downloaded operating software before starting it. The fields provided, in the case of GSM/GPRS, are at least a set of the following ones:
Message_Type: identifies the sent message type (Packet Test Description);
OTA-Client_ID: identifies the OTA-Client to which the message is sent;
Test_list: comprises one element for each test to be performed and includes in turn the field:
Test_vector: comprises the test description.

Again with reference to FIG. 8, it is described the structure of the message Packet Installation Successful. This message is sent from the OTA-Client to the OTA-Server. Using this message the OTA-Client indicates to the OTA-Server that the testing of the downloaded operating software has been successful. The fields provided, in the case of GSM/GPRS, are at least a set of the following ones:
Message_Type: identifies the sent message type (Packet Installation Successful);
OTA-Client_ID: identifies the OTA-Client sending the message.

Again with reference to FIG. 8, it is described the structure of the message Packet Installation Failed. This message is sent from the OTA-Client to the OTA-Server. Using this message the OTA-Client informs the OTA-Server that the testing of the downloaded operating software has not been successful. The fields provided, in the case of GSM/GPRS, are at least a set of the following ones:

Message_Type: identifies the sent message type (Packet Installation Failed);

OTA-Client_ID: identifies the OTA-Client sending the message.

The operating software is transmitted from the OTA-Server to the OTA-Client by using, in the preferred embodiment, a window protocol of known type, based, for example, on two basic Protocols Data Units, or PDUs, called Block and Ack, as will be described later on.

Figure 16:
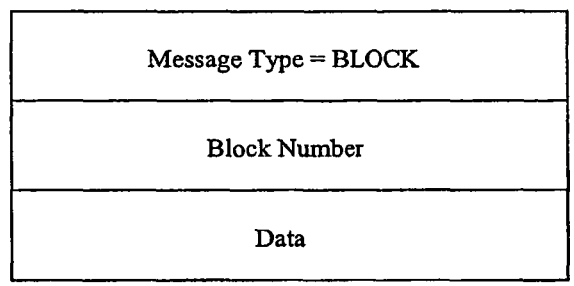

With reference to FIG. 16, it is described the structure of a radio block Block into which the operating software has been segmented. The fields provided, in the case of GSM/GPRS, are at least a set of the following ones:

Message_Type: identifies the block type;

Block_Number identifies the sequential number of the radio block; this sequential number is used by the OTA-Client to reassemble the whole operating software;

Data: this is the field containing some portions of the whole operating software.

Figure 17:
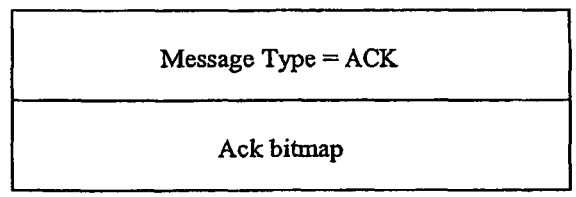

With reference to FIG. 17, it is described the structure of the message Ack used for indicating the terminal receiving state. The fields provided, in the case of GSM/GPRS, are at least a set of the following ones:

Message_Type: identifies the sent message type (Ack);

Ack_Bitmap: it is a bit mask having a size equal to the total number of radio blocks into which the operating software has been segmented; for each radio block it is set to "1" if the block has been successfully received and it is set to "0" if the block has been received but corrupted or has not been received at all.

The modifications to the RR protocol foreseen by the preferred embodiment of the invention, are based on the introduction of primitives between the OTA-Client and the radio resource RR on the terminal MS side and on the introduction of primitives between the OTA-Server and the radio resource RR at the base station controller BSC side.

The terms used for naming the primitives and related fields are purely indicative, as it is significant the corresponding definition as described.

First are described the primitives between the OTA-Client and the radio resource RR at the terminal MS side.

The primitive Download Request Ind is sent from the radio resource RR at the terminal MS side to the OTA-Client.

The fields provided, in the case of GSM/GPRS, are at least a set of the following ones:

OTA-Client_ID: identifies the OTA-Client towards which the request is performed;

Requested Download: this element contains a description string and a numerical identifier of the requested download by the network.

The primitive Download Ack Ind is sent by the OTA-Client to the radio resource RR at the terminal MS side. The fields provided in this primitive are the following ones:

OTA-Client_ID: identifies the OTA-Client related to the primitive;

OTA-Client_Challenge_Number: is a random number that the OTA-Server will encrypt with its own key and a suitable ciphering algorithm, for instance AES algorithm, in order to perform the first step of the mutual authentication.

The primitive Download Nack Ind is sent from the OTA-Client to the radio resource RR at the terminal MS side. The fields provided, in the case of GSM/GPRS, are at least a set of the following ones:

OTA-Client_ID: identifies the OTA-Client related to the primitive.

The primitive Authentication Req is sent from the radio resource RR at the terminal MS side to the OTA-Client.

The fields provided in this primitive are the following ones:

OTA-Client_ID: identifies the OTA-Client related to the primitive;

OTA-Server_Response_Number: is a number encrypted by the OTA-Server with its own key and a suitable ciphering algorithm, like for instance AES algorithm, concluding the first step of the mutual authentication;

OTA-Server_Challenge_Number: is a random number that the client will encrypt with its own key and a suitable ciphering algorithm, like for instance AES algorithm, in order to perform the second step of the mutual authentication;

The primitive Authentication Rsp is sent from the OTA-Client to the radio resource RR at the terminal MS side.

The fields provided, in the case of GSM/GPRS, are at least a set of the following ones:

OTA-Client_ID: identifies the OTA-Client related to the primitive;

OTA-Client_Response_Number: identifies a number encrypted by the OTA-Client with its own key and a suitable ciphering algorithm, like for instance AES algorithm, concluding the second and last step of the mutual authentication.

The primitive Capability Req is sent from the radio resource RR at the MS side to the OTA-Client.

The fields provided, in the case of GSM/GPRS, are at least a set of the following ones:

OTA-Client_ID: identifies the OTA-Client related to the primitive.

The primitive Capability Rsp is sent from the OTA-Client to the radio resource RR at the terminal MS side.

The fields provided, in the case of GSM/GPRS, are at least a set of the following ones:

OTA-Client ID: identifies the OTA-Client sending the message;

OTA-Client_Capability: describes the terminal reconfigurability options.

The primitive Download Description Req is sent from the radio resource RR at the terminal MS side to the OTA-Client.

The fields provided, in the case of GSM/GPRS, are at least a set of the following ones:

OTA-Client_ID: identifies the OTA-Client related to the primitive;

Downloads_list: comprises one element for each download selected by the OTA-Client, which in turn includes the following fields:

Download_Block_Number is the number of radio blocks into which the operating software will be segmented before being transmitted to the OTA-Client;

Billing_criteria: are the criteria concerning the possible download billing;

Installation_criteria: are the criteria concerning the software installation.

The primitive Download Accept Cnf is sent from the OTA-Client to the radio resource RR at the terminal MS side.

The fields provided, in the case of GSM/GPRS, are at least a set of the following ones:
   OTA-Client_ID: identifies the OTA-Client related to the primitive.

The primitive Download Accept Rej is sent from the OTA-Client to the radio resource RR at the terminal MS side.
The fields provided, in the case of GSM/GPRS, are at least a set of the following ones:
   OTA-Client_ID: identifies the OTA-Client related to the primitive.

The primitive License Req is sent from the OTA-Client to the radio resource RR at the terminal MS side.
The fields provided, in the case of GSM/GPRS, are at least a set of the following ones:
   OTA-Client_ID: identifies the OTA-Client related to the primitive.

The primitive License Rsp is sent from the radio resource RR at the terminal MS side to the OTA-Client.
The fields provided, in the case of GSM/GPRS, are at least a set of the following ones:
   OTA-Client_ID: identifies the OTA-Client related to the primitive;
   Decrypt_key: is the key used for decrypting the operating software.

The primitive License Cnf is sent from the OTA-Client to the radio resource RR at the terminal MS side.
The fields provided, in the case of GSM/GPRS, are at least a set of the following ones:
   OTA-Client_ID: identifies the OTA-Client related to the primitive.

The primitive License Rej is sent from the OTA-Client to the radio resource RR at the terminal MS side.
The fields provided, in the case of GSM/GPRS, are at least a set of the following ones:
   OTA-Client_ID: identifies the OTA-Client related to the primitive.

The primitive Test Description Req is sent from the radio resource RR at the terminal MS side to the OTA-Client.
The fields provided, in the case of GSM/GPRS, are at least a set of the following ones:
   OTA-Client_ID: identifies the OTA-Client related to the primitive;
   Test_list comprises one element for each test to be performed and includes in turn the field:
      Test_vector: comprises the test description.

The primitive Installation Cnf is sent from the OTA-Client to the radio resource RR at the terminal MS side.
The fields provided, in the case of GSM/GPRS, are at least a set of the following ones:
   OTA-Client_ID: identifies the OTA-Client related to the primitive.

The primitive Installation Rej is sent from the OTA-Client to the radio resource RR at the terminal MS side.
The fields provided, in the case of GSM/GPRS, are at least a set of the following ones:
   OTA-Client_ID: identifies the OTA-Client related to the primitive.

The primitive Data Ind is sent from the radio resource RR at the terminal MS side to the OTA-Client.
The fields provided, in the case of GSM/GPRS, are at least a set of the following ones:
   OTA-Client_ID: identifies the OTA-Client related to the primitive;
   One of the radio blocks into which the operating software has been segmented.

The primitive Data Req is sent from the OTA-Client to the radio resource RR at the terminal MS side.
The fields provided, in the case of GSM/GPRS, are at least a set of the following ones:
   OTA-Client_ID: identifies the OTA-Client related to the primitive;
   Radio block of Ack.

The primitives exchanged between the OTA-Server and the radio resource RR at the base station controller BSC side are described in the following.

The primitive Download Initiation Ind is sent from the OTA-Client to the radio resource RR at the base controller station BSC side. The fields provided, in the case of GSM/GPRS, are at least a set of the following ones:
   OTA-Client_ID: identifies the OTA-Client towards which the request is performed;
   Requested Download: this element contains a description string and a numerical identifier of the requested download by the network.

The primitive Download Ack Ind is sent by the radio resource RR at the base controller station BSC side to the OTA-Client.
The fields provided, in the case of GSM/GPRS, are at least a set of the following ones:
   OTA-Client_ID: identifies the OTA-Client related to the primitive;
   OTA-Client_Challenge_Number: is a random number that the OTA-Server will encrypt with its own key and a suitable ciphering algorithm, for instance AES algorithm, in order to perform the first step of the mutual authentication.

The primitive Download Nack Ind is sent from the radio resource RR at the base controller station BSC side to the OTA-Client.
The fields provided, in the case of GSM/GPRS, are at least a set of the following ones:
   OTA-Client_ID: identifies the OTA-Client related to the primitive.

The primitive Authentication Req is sent from the OTA-Client to the radio resource RR at the base controller station BSC side.
The fields provided, in the case of GSM/GPRS, are at least a set of the following ones:
   OTA-Client_ID: identifies the OTA-Client related to the primitive;
   OTA-Server_Response_Number: is a number encrypted by the OTA-Server with its own key and a suitable ciphering algorithm, like for instance AES algorithm, concluding the first step of the mutual authentication;
   OTA-Server_Challenge_Number: is a random number that the OTA-Client will encrypt with its own key and a suitable ciphering algorithm, like for instance AES algorithm, in order to perform the second step of the mutual authentication;

The primitive Authentication Rsp is sent from the radio resource RR at the base station controller BSC side to the OTA-Client.
The fields provided, in the case of GSM/GPRS, are at least a set of the following ones:
   OTA-Client_ID: identifies the OTA-Client related to the primitive;
   OTA-Client_Response_Number: identifies a number encrypted by the OTA-Client with its own key and a suitable ciphering algorithm, like for instance AES algorithm, concluding the second and last step of the mutual authentication.

The primitive Capability Req is sent from the OTA-Client to the radio resource RR at the base station controller BSC side.

The fields provided, in the case of GSM/GPRS, are at least a set of the following ones:

OTA-Client_ID: identifies the OTA-Client related to the primitive.

The primitive Capability Rsp is sent from the radio resource RR at the base station controller BSC side to the OTA-Client.

The fields provided, in the case of GSM/GPRS, are at least a set of the following ones:

OTA-Client ID: identifies the OTA-Client sending the message;

OTA-Client_Capability: describes the terminal reconfigurability options.

The primitive Download Description Req is sent from the OTA-Client to the radio resource RR at the base station controller BSC side.

The fields provided, in the case of GSM/GPRS, are at least a set of the following ones:

OTA-Client_ID: identifies the OTA-Client related to the primitive;

Downloads_list: comprises one element for each download selected by the OTA-Client, which in turn includes the following fields:

Download_Block_Number: is the number of radio blocks into which the operating software will be segmented before being transmitted to the OTA-Client;

Billing_criteria: are the criteria concerning the possible download billing;

Installation_criteria: are the criteria concerning the software installation.

The primitive Download Accept Cnf is sent from the radio resource RR at the base station controller BSC side to the OTA-Client.

The fields provided, in the case of GSM/GPRS, are at least a set of the following ones:

OTA-Client_ID: identifies the OTA-Client related to the primitive.

The primitive Download Accept Rej is sent from the radio resource RR at the base controller station BSC side to the OTA-Client.

The fields provided, in the case of GSM/GPRS, are at least a set of the following ones:

OTA-Client_ID: identifies the OTA-Client related to the primitive.

The primitive License Req sent from the radio resource RR at the base station controller BSC side to the OTA-Client.

The fields provided, in the case of GSM/GPRS, are at least a set of the following ones:

OTA-Client_ID: identifies the OTA-Client related to the primitive.

The primitive License Rsp is sent by the OTA-Client to the radio resource RR at the base station controller BSC side.

The fields provided, in the case of GSM/GPRS, are at least a set of the following ones:

OTA-Client_ID: identifies the OTA-Client related to the primitive;

Decrypt_key: is the key used for decrypting the operating software.

The primitive License Cnf is sent from the radio resource RR at the base station controller BSC side to the OTA-Client.

The fields provided, in the case of GSM/GPRS, are at least a set of the following ones:

OTA-Client_ID: identifies the OTA-Client related to the primitive.

The primitive License Rej is sent from the radio resource RR at the base station controller BSC side to the OTA-Client.

The fields provided, in the case of GSM/GPRS, are at least a set of the following ones:

OTA-Client_ID: identifies the OTA-Client related to the primitive.

The primitive Test Description Req is sent from the OTA-Server to the radio resource RR at the base station controller BSC side.

The fields provided, in the case of GSM/GPRS, are at least a set of the following ones:

OTA-Client_ID: identifies the OTA-Client related to the primitive;

Test_list: comprises one element for each test to be performed and includes in turn the field:

Test_vector comprises the test description.

The primitive Installation Cnf is sent from the radio resource RR at the base station controller BSC side to the OTA-Client.

The fields provided, in the case of GSM/GPRS, are at least a set of the following ones:

OTA-Client_ID: identifies the OTA-Client related to the primitive.

The primitive Installation Rej is sent from the radio resource RR at the base station controller BSC side to the OTA-Client.

The fields provided, in the case of GSM/GPRS, are at least a set of the following ones:

OTA-Client_ID: identifies the OTA-Client related to the primitive.

The primitive Data Req is sent from the OTA-Server to the radio resource RR at the base station controller BSC side.

The fields provided, in the case of GSM/GPRS, are at least a set of the following ones:

OTA-Client_ID: identifies the OTA-Client related to the primitive;

One of the radio blocks into which the operating software has been segmented.

The primitive Data Ind is sent from the radio resource RR at the base station controller BSC side to the OTA-Server.

The fields provided, in the case of GSM/GPRS, are at least a set of the following ones:

OTA-Client_ID: identifies the OTA-Client related to the primitive;

Radio block of the Ack.

With reference to FIGS. 4 and 5, the procedural interactions between the OTA-Client and the OTA-Server will be described by indicating, for each primitive received by the respective RR, the relative behaviour according to the state in which the OTA-Client or the Client-Context are.

The behaviour of OTA-Client and the OTA-Server are independent from the system.

The primitives exchanged between OTA-Client or OTA-Server and the respective RR are dependent from the system, and according to present example are referenced to GSM/GPRS system.

In the following description the start/stop actions of the timers are not described, as they are linked to the states in which the entities are, as previously described.

With reference to FIG. 4, it is now described the behaviour of the OTA-Client.

In general, if the field OTA-Client ID does not match with the identifier of the OTA-Client receiving a primitive, said primitive is ignored.

When the OTA-Client receives the primitive Download Request Ind:
if the state is IDLE, the OTA-Client goes to DOWNLOAD INITIATION;
if the state is not DOWNLOAD INITIATION, then the primitive is ignored and the procedure does not continue;
if the terminal is able to perform the download:
a random number RNUM is drawn and stored;
the primitive Download Ack Ind, containing the value of the drawn number RNUM in the field OTA-Client Challenge number is sent;
if the terminal is not able to perform the download, the primitive Download Nack Ind is sent and the OTA-Client returns to the state IDLE.

When the OTA-Client receives the primitive Authentication Req:
if the state is not DOWNLOAD INITIATION, the primitive is ignored and the procedure does not continue;
if the stored random number RNUM is not valid, the procedure does not continue;
the OTA-Client goes to the state MUTUAL AUTHENTICATION;
the value of the stored random number RNUM is encrypted with the internal key CIK by using the selected ciphering algorithm, e.g. AES algorithm;
if the value encrypted at the previous stage does not match with the value of the field OTA-Server Response number, the OTA-Client passes to the state IDLE and the procedure does not continue;
the value of the field OTA-Server Challenge number is encrypted with the internal key CIK (Clienti Identity Key) by using the selected ciphering algorithm, e.g. AES algorithm;
the primitive Authentication Rsp is sent with value encrypted at the previous stage in the field OTA-Client Response Number.

When the OTA-Client receives the primitive Capability Req:
if the state is not MUTUAL AUTHENTICATION, the primitive is ignored and the procedure does not continue;
the OTA-Client goes to the state CAPABILITY REQUEST;
the primitive Capability Response is sent.

When the OTA-Client receives the primitive Download Description Req:
if the state is not CAPABILITY REQUEST, the primitive is ignored and the procedure does not continue;
the OTA-Client goes to the state DOWNLOAD ACCEPTANCE;
if the terminal is able to install the software:
the primitive Download Accept Cnf is sent;
if the terminal is not able to install the software:
the primitive Download Accept Rej is sent;
the OTA-Client passes to the state IDLE.

When the OTA-Client receives the primitive License Rsp:
if the state is not INSTALLATION, the primitive is ignored and the procedure does not continue;
the downloaded software is decrypted by using the key indicated in the field Decrypt Key,
if the decryption is successful:
the primitive License Cnf is sent;
the downloaded operating software is stored;
if the decryption is unsuccessful:
the primitive License Rej is sent:
the procedure goes to the state IDLE.

When the OTA-Client receives the primitive Test Description Req:
if the state is not INSTALLATION, the primitive is ignored and the procedure does not continue;
the OTA-Client goes to the state IN-SITU TESTING;
the received tests are performed on the previously stored operating software;
if all tests have been successful:
the primitive Installation Cnf is sent;
the new operating software is installed and started;
if at least one test is unsuccessful:
the primitive Installation Rej is sent;
the download operating software is deleted from the memory;
the OTA-Client goes to the state IDLE.

With reference again to FIG. 5, it is now described the behaviour of the OTA-Server.

In general, at each primitive received it is analysed the field OTA-Client ID and it is considered the OTA-Client-Context relative to said identifier; if no OTA-Client-Context is present for the received identifier, the primitive is ignored.

When the OTA-Server receives the primitive Download Ack Ind:
if the state of the OTA-Client-Context is not DOWNLOAD INITIATION, the primitive is ignored and the procedure does not continue;
the OTA-Client-Context goes to the state MUTUAL AUTHENTICATION;
a random number is drawn and stored;
the value of the field OTA-Client Challenge number is encrypted with the internal key SIK (Server Identity Key) by using the selected ciphering algorithm, e.g. AES algorithm;
the primitive Authentication Req is sent to the OTA-Client with the value encrypted at the previous stage in the field OTA-Server Response number and with the value of the drawn number in the field OTA-Server Challenge number.

When the OTA-Client-Context receives the primitive Download Nack Ind:
if the state of the OTA-Client-Context is not DOWNLOAD INITIATION, the is primitive is ignored and the procedure does not continue;
the OTA-Client-Context goes to the state IDLE.

When the OTA-Client-Context receives the primitive Authentication Rsp:
if the state of the OTA-Client-Context is not MUTUAL AUTHENTICATION, the primitive is ignored and the procedure does not continue;
the value of the stored random number is encrypted with the internal key SIK by using the selected ciphering algorithm, e.g. AES algorithm;
if the value encrypted at the previous stage does not match with the value of the field OTA-Client Response Number, the OTA-Client-Context goes to the state IDLE and does not continue;
the OTA-Server goes to the state CAPABILITY REQUEST;
the primitive Capability Req is sent.

When the OTA-Client-Context receives the primitive Capability Rsp:
if the state of the OTA-Client-Context is not CAPABILITY REQUEST, the primitive is ignored and the procedure does not continue;
if the capability contained in the primitive are not compatible with the software to be downloaded, the OTA-Client-Context goes to the state IDLE;

if the capability contained in the primitive are compatible with the software to be downloaded, the OTA-Client-Context goes to the state DOWNLOAD ACCEPTANCE and the primitive Download Description Req is sent.

When the OTA-Client-Context receives the primitive Download Accept Cnf.
  if the state of the OTA-Client-Context is not DOWNLOAD ACCEPTANCE, the primitive is ignored and the procedure does not continue;
  the OTA-Client-Context goes to the state SOFTWARE DOWNLOAD;
  the software download begins.

When the OTA-Client-Context receives the primitive Download Accept Rej:
  if the state of the OTA-Client-Context is not DOWNLOAD ACCEPTANCE, the primitive is ignored and the procedure does not continue;
  the OTA-Client-Context goes to the state IDLE.

When the OTA-Client-Context receives the primitive License Req:
  if the state of the OTA-Client-Context is not SOFTWARE DOWNLOAD, the primitive is ignored and the procedure does not continue;
  the procedure goes to the state INSTALLATION;
  the protocol primitive License Rsp, containing the decryption key, is sent.

When the OTA-Client-Context receives the primitive License Cnt.
  if the state of the OTA-Client-Context is not INSTALLATION, the primitive is ignored and the procedure does not continue;
  the primitive Test Description Req is sent.

When the OTA-Client-Context receives the primitive License Rej:
  if the state of the OTA-Client-Context is not INSTALLATION, the primitive is ignored and the procedure does not continue;
  the OTA-Client-Context goes to the state IDLE.

When the OTA-Client-Context receives the primitive Installation Cnf:
  if the state of the OTA-Client-Context is not INSTALLATION, the primitive is ignored and the procedure does not continue;
  the OTA-Client-Context goes to the state IDLE.

When the OTA-Client-Context receives the primitive Installation Rej:
  if the state of the OTA-Client-Context is not INSTALLATION, the primitive is ignored and the procedure does not continue;
  the OTA-Client-Context goes to the state IDLE.

The operation of the window protocol according to which the data are transferred from the OTA-Server to the OTA-Client is now described.

From the point of view of the OTA-Server, when the software download begins, the operating software is, for example, encrypted with a encrypt key and with an encryption algorithm of known type, e.g. AES algorithm.

The encrypted operating software is segmented into blocks having, for example, a limited size, e.g. 1-2 kBytes. It is allocated a bit mask BITMASK having a number of bits equal to the number of radio blocks into which the operating software has been segmented and for each bit the value "0" is set; each bit of the mask corresponds to the radio block, the number of which is equal to the bit position, that is the first bit corresponds to the first radio block, the second bit to the second radio block and so on. The first N radio blocks BLOCK constituting the operating software are sent. The timer T401 is started. At the reception of each message Ack:
  the timer T401 is restarted;
  for each value "1" existing in the bitmap of the message Ack, it is set to "1" the value of the mask BITMASK allocated in the corresponding position;
  at the maximum are sent the first N radio blocks BLOCK that in the mask BITMASK correspond to the value "0", considering first the not-sent-yet blocks;
  the download ends when all bits of the mask BITMASK have a value equal to "1".

From the point of view of the OTA-Client, when the software download begins, it is allocated a bit mask BITMASK equal to the number of radio blocks into which the software has been segmented and the value of each bit is set to "0"; each bit of the mask corresponds to the radio block, the number of which is equal to the bit position, that is the first bit corresponds to the first radio block, the second bit to the second radio block and so on. Then the timer T400 is started. When receiving each radio block BLOCK:
  the timer T400 is restarted;
  the bit of the mask BITMASK corresponding to the Block Number of the received radio block is set to "1";
  it is sent a message Ack with the bitmap corresponding to the mask BITMASK;
  the download ends when all bits of the mask BITMASK have value "1".

In summary, according to the example, the functional behaviour of OTA client and OTA server is as follows:
  the download procedure is started, for example, upon receiving the protocol message Handover_Command sent by the MSC (Mobile Switching Centre) to the base station controller BSC;
  the mutual authentication between OTA Client and OTA Server occurs according to, for example, the "challenge-response" method;
  the operating software to be downloaded is sent on a traffic channel, e.g. the GPRS traffic channel;
  the operating software to be downloaded is segmented by the OTA-Server into blocks having a reduced size (e.g. 1 or 2 kBytes);
  the transferring of the operating software is managed by a simple window protocol wherein the size window matches with the number of blocks into which the operating software has been segmented;
  the downloaded operating software may be encrypted and a key, in this case, is needed for its decryption and installation;
  before starting the operating software, the OTA client checks it with suitable tests suggested, for example, by the OTA server.

Figure 18:
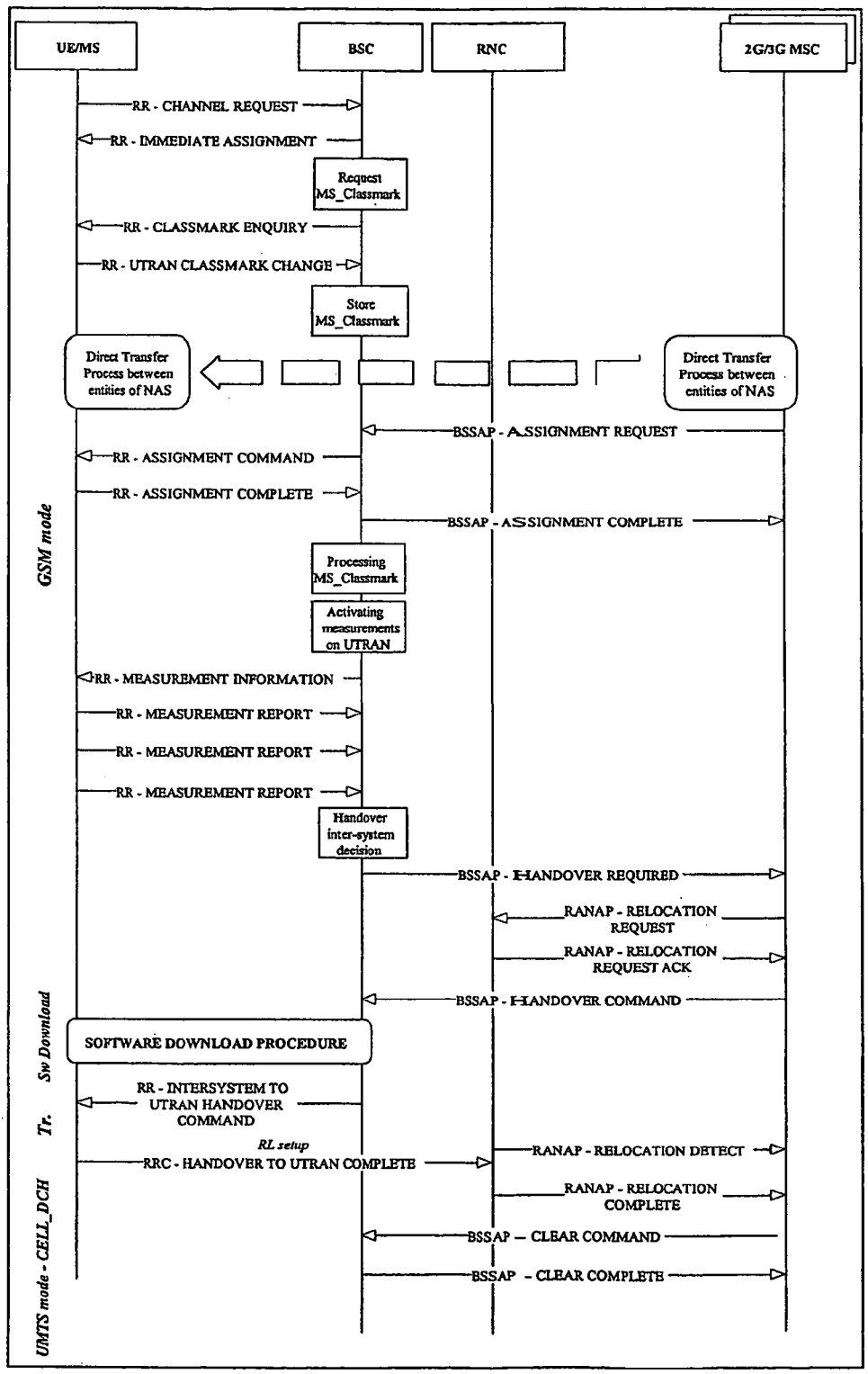
FIG. 18 illustrates an inter-system hand-over procedure from GSM to UMTS for a circuit call.

With reference to FIG. 18, it is illustrated an applicative example of the inter-system hand-over procedure from GSM to UMTS for a circuit call, as defined by the Standard, inside which the download procedure of the operating software able to reconfigure the terminal MS has been introduced.

Figure 19:
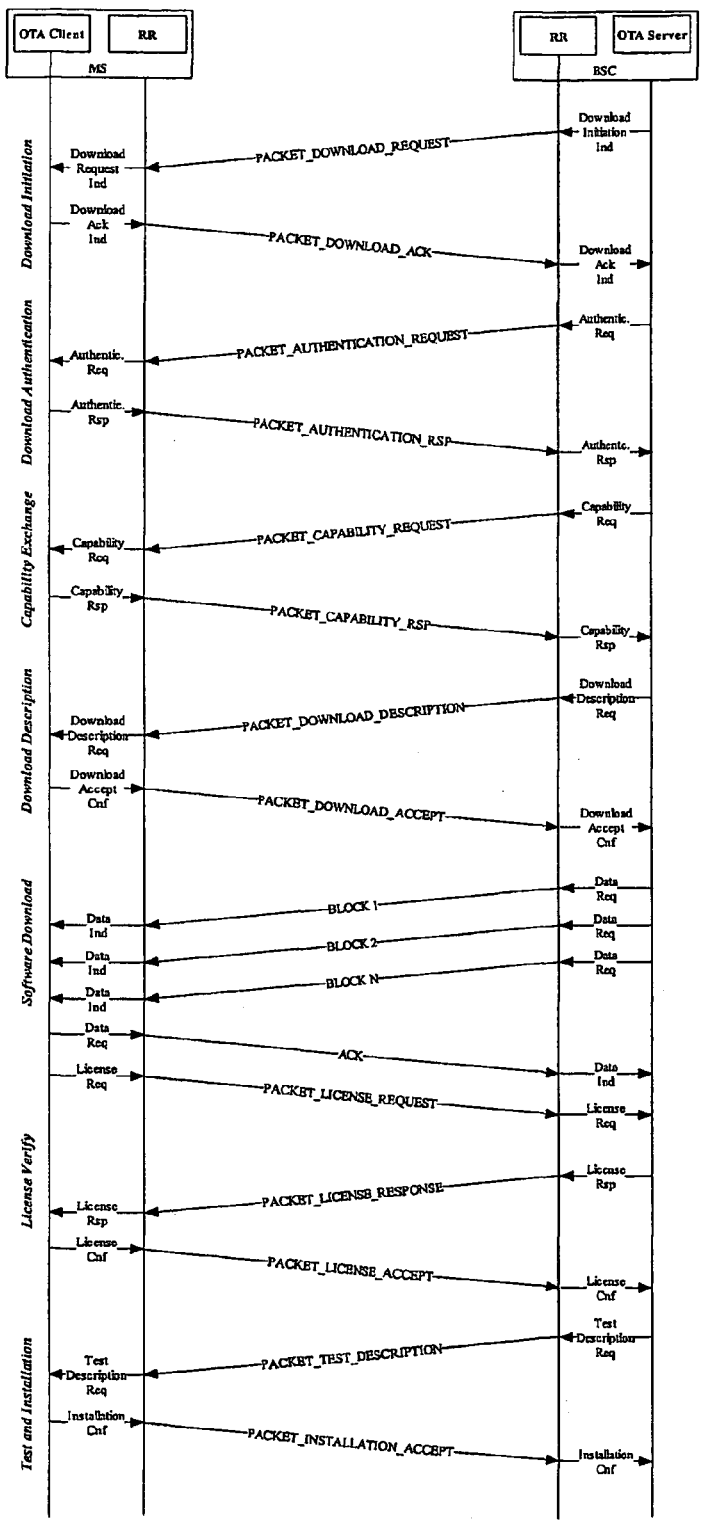
FIG. 19 illustrates in detail a software download procedure for reconfiguring a radio terminal.
Figure 20:
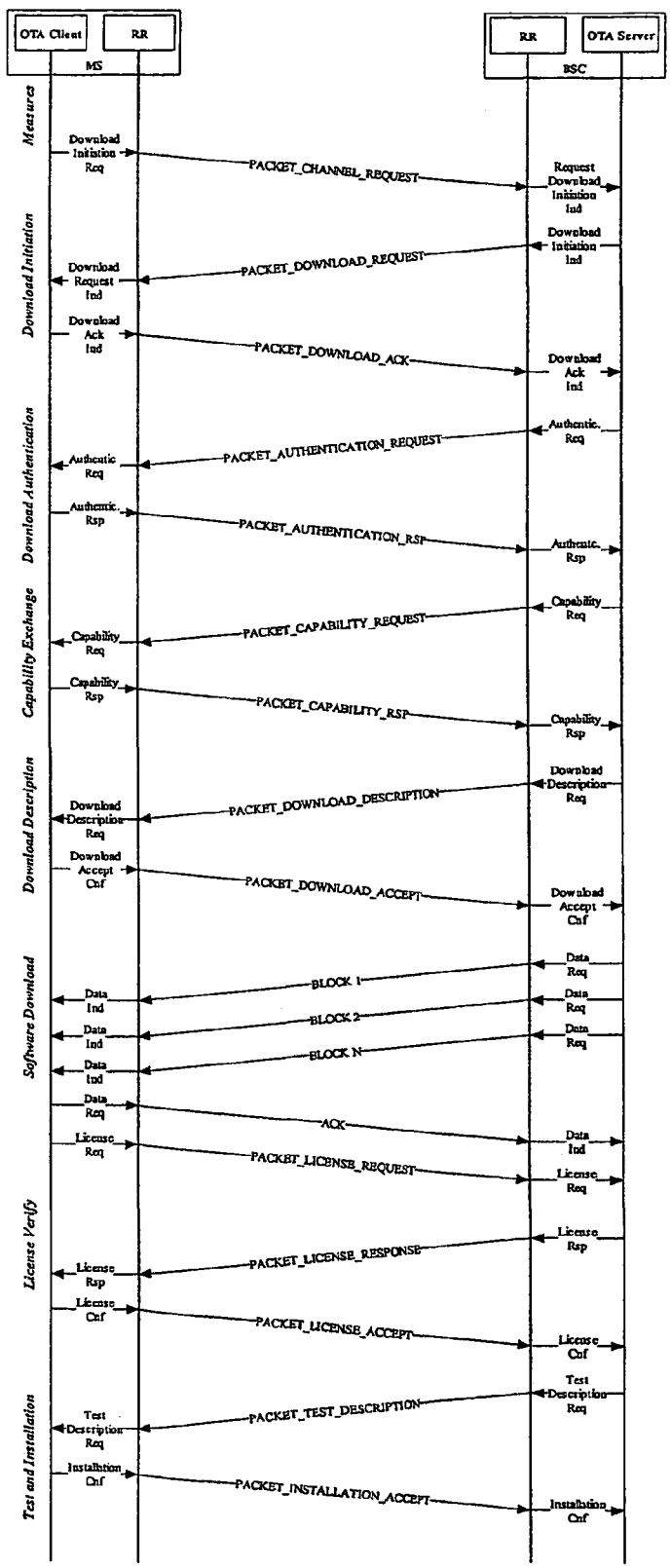
FIG. 20 illustrates the download procedure of the operating software in case of cell-reselection.

With reference to FIG. 19, it is explained how said software download procedure works, pointing out the interactions between the different entities existing in the network.

1. The OTA-Client and the OTA-Client-Context relative to the considered OTA-Client and present in the OTA-Server are in the state IDLE.
2. When receiving the protocol message Handover_Command from the Mobile Switching Centre (MSC), the OTA-Client-Context passes from the state IDLE to the state DOWNLOAD INITIATION, starts the timer T101 and sends the primitive Download_Initiation_Ind to the radio resource RR while indicating the requested download.
3. The radio resource RR receives the primitive Download_Initiation_Ind. The radio resource RR requests to the radio resource management RRM the downlink resources necessary for making it possible to perform the software download.
   a. If the resources are available, the radio resource RR sends on the control channel FACCH (Fast Associated Control Channel) the protocol message Packet_Download_Request to the radio resource RR of the terminal MS wherein it indicates the channels PDCH on which the terminal shall perform the download, the Relative Reserved Block Period RRBP and the requested download.
   b. If the resources are not available, the radio resource RR sends the primitive Download Nack Ind to the OTA-Client-Context.
4. The radio resource RR of the terminal MS receives the protocol message Packet_Download_Request, configures the channels PDCH and sends the primitive Download_Request_Ind.
5. The OTA-Client receives the primitive Download_Request_Ind. If the terminal is able to perform the download, the OTA-Client passes from the state IDLE to the state DOWNLOAD_INITIATION, starts the timer T100 and sends the primitive Download_Ack_Ind wherein it specifies to the radio resource RR its own identifier. The radio resource RR locally stores the identifier of the OTA-Client.
6. The radio resource RR receives the primitive Download_Ack_Ind and sends on the PACCH (Packet Associated Control Channel) at the time specified by the Relative Reserved Block Period RRBP the protocol message Packet_Download_Ack to the radio resource RR of the base station controller BSC wherein it indicates the identifier of the OTA-Client.
7. The radio resource RR of the base station controller BSC receives the protocol message Packet_Download_Ack and sends the primitive Download_Ack_Ind to the OTA-Client-Context wherein it specifies the identifier of the OTA-Client.
8. The OTA-Client-Context receives the primitive Download_Ack_Ind; the OTA-Client-Context stops the timer T101 and passes from the state DOWNLOAD_INITIATION to the state MUTUAL_AUTHENTICATION, while starting the timer T201; the primitive Authentication_Req is sent to the radio resource RR.
9. The radio resource RR receives the primitive Authentication_Req and sends on the control channel PACCH the protocol message Packet_Authentication_Request to the radio resource RR of the terminal MS wherein the RRBP is indicated.
10. The radio resource RR of the terminal MS receives the protocol message Packet_Authentication Request and sends the primitive Authentication_Req to the OTA-Client.
11. The OTA-Client receives the primitive Authentication_Req, stops the timer T100 and goes to the state MUTUAL_AUTHENTICATION while starting the timer T200; at this stage the authentication of the OTA-Server is performed:
    a. If the OTA-Server is not authenticated, the OTA-Client stops the timer T200 and goes back to the state IDLE.
    b. If the OTA-Server is authenticated, the OTA-Client sends the primitive Authentication_Rsp to the radio resource RR.
12. The radio resource RR receives the primitive Authentication_Rsp and sends on the PACCH at the time specified by the Relative Reserved Block Period RRBP the protocol message Packet_Authentication_Response to the radio resource RR of the base station controller BSC.
13. The radio resource RR of the base station controller BSC receives the protocol message Packet_Authentication_Response and sends the primitive Authentication_Rsp to the OTA-Client-Context.
14. The OTA-Client-Context receives the primitive Authentication_Rsp and verifies the authentication of the OTA-Client:
    a. If the OTA-Client is not authenticated, the timer T201 is interrupted and the OTA-Client-Context comes back to the state IDLE.
    b. If the OTA-Client is authenticated, the timer T201 is interrupted and the OTA-Client-Context goes to the state CAPABILITY REQUEST while starting the timer T301. The OTA-Client-Context sends to the radio resource RR the primitive Capability_Req.
15. The radio resource RR receives the primitive Capability_Req and sends on the control channel PACCH the protocol message Packet_Capability_Req to the radio resource RR of the terminal MS wherein it is specified the RRBP.
16. The radio resource RR of the terminal MS receives the protocol message Packet_Capability_Req and sends the primitive Capability_Req to the OTA-Client.
17. The OTA-Client receives the primitive Capability_Req, stops the timer T200 and goes to the state CAPABILITY REQUEST, while starting the timer T300; the OTA-Client sends the primitive Capability_Rsp to the radio resource RR.
18. The radio resource RR receives the primitive Capability_Rsp and sends on the PACCH at the time specified by the RRBP the protocol message Packet_Capability_Response to the radio resource RR of the base station controller BSC.
19. The radio resource RR of the base station controller BSC receives the protocol message Packet_Capability_Response and sends the primitive Capability_Rsp to the OTA-Client-Context.
20. The OTA-Client-Context receives the primitive Capability_Rsp and verifies the capability of the terminal:
    a. If the capability is not compatible with the software download, the timer T301 is interrupted and the OTA-Client-Context goes back to the state IDLE.
    b. If the capability is compatible with the software download, the timer T301 is interrupted and the OTA-Client-Context goes to the state DOWNLOAD ACCEPTANCE, while starting the timer T302 and sending to the radio resource RR the primitive Download_Description_Req wherein it is indicated the information relative to the download operation (number of radio blocks to download, billing, installation and so on).
21. The radio resource RR receives the primitive Download_Description_Req and sends on the control channel PACCH the protocol message Packet_Download_Description to the radio resource RR of the terminal MS wherein it is specified the RRBP.
22. The radio resource RR of the terminal MS receives the protocol message Packet_Download_Description and sends the primitive Download_Description_Req to the OTA-Client.
23. The OTA-Client receives the primitive Download_Description_Req, stops the timer T300 and goes to the state DOWNLOAD ACCEPTANCE; the OTA-Client verifies the information received:
    a. If the download is not accepted, the OTA-Client sends the primitive Download_Accept_Rej to the radio resource RR and returns to the state IDLE.

b. If the download is accepted, the OTA-Client sends the primitive Download_Accept_Cnf to the radio resource RR and goes to the state SOFTWARE DOWNLOAD while starting the timer T400.

24. The radio resource RR receives the primitive Download_Accept_Cnf and sends on the PACCH at the time specified by the RRBP the protocol message Packet_Download_Accept to the radio resource RR of the base station controller BSC.
25. The radio resource RR of the base station controller BSC receives the protocol message Packet_Download_Accept and sends the primitive Download_Accept_Cnf to the OTA-Client-Context.
26. The OTA-Client-Context receives the primitive Download_Accept_Cnf, stops the timer T302 and the OTA-Client-Context goes to the state SOFTWARE DOWNLOAD while activating the timer T400; the OTA-Client-Context starts the download and by sending primitives Data_Req to the radio resource RR begins to transmit the various blocks of the software to be downloaded. The transferring of the radio blocks occurs by means of a traditional window protocol. The radio blocks are transmitted on the channel PDTCH (Packet Data Transfer Channel).
27. The OTA-Client receives each radio block through the reception of primitives Data_Ind from the radio resource RR; at each received block, the timer T400 is restarted; periodically the OTA-Client sends to the OTA-Client-Context an acknowledgement signal Ack by sending the primitive Data_Req to the radio resource RR. The radio resource RR sends the Ack on the associated control channel PACCH. When the OTA-Client sends the Ack relative to the last radio block to be downloaded, stops the timer T400 and goes to the state INSTALLATION, while starting the timer T500; the primitive License_Req is sent to the radio resource RR.
28. The OTA-Client-Context receives the various messages Ack through the reception of primitives Data_Ind from the radio resource RR; at each Ack received the timer T401 is restarted. When the OTA-Client-Context receives the Ack relative to the last radio block, stops the timer T401 and goes to the state INSTALLATION, while starting the timer T501.
29. The radio resource RR receives the primitive License_Req and sends on the associated control channel PACCH the protocol message Packet_License_Request to the radio resource RR of the base station controller BSC.
30. The radio resource RR of the base station controller BSC receives the protocol message Packet_License_Request, and sends the primitive License_Req to the OTA-Client-Context.
31. The OTA-Client-Context receives the primitive License_Req and sends to the radio resource RR the primitive License_RSP while indicating the key for performing the software decryption.
32. The radio resource RR receives the primitive License_Rsp and sends on the associated control channel PACCH the protocol message Packet_License_Response to the radio resource RR of the terminal MS.
33. The radio resource RR of the terminal MS receives the protocol message Packet_License_Response and sends the primitive License_Rsp to the OTA-Client.
34. The OTA-Client receives the primitive License_Rsp and decrypts the software with the received key:
a. If the decryption operation is successful, the OTA-Client sends the primitive License_Cnf to the radio resource RR.
b. If the decryption operation is unsuccessful, the OTA-Client sends the primitive License_Rej to the radio resource RR, stops the timer T500 and returns to the state IDLE.
35. The radio resource RR receives the primitive License_Cnf and sends on the associated control channel PACCH the protocol message Packet_License_Accept to the radio resource RR of the base station controller BSC.
36. The radio resource RR of the base station controller BSC receives the protocol message Packet_License_Accept, and sends the primitive License_Cnf to the OTA-Client-Context.
37. The OTA-Client-Context receives the primitive License_Cnf and sends to the radio resource RR the primitive Test_Description_Req while indicating the information relative to the tests to be performed.
38. The radio resource RR receives the primitive Test_Description_Req and sends on the associated control channel PACCH the protocol message Packet_Test_Description to the radio resource RR of the terminal MS.
39. The radio resource RR of the terminal MS receives the protocol message Packet_Test_Description and sends the primitive Test_Description_Req to the OTA-Client.
40. The OTA-Client receives the primitive Test_Description_Req, stops the timer T500 and goes to the state IN-SITU TESTING. The OTA-Client performs the test on the software downloaded as indicated by the OTA-Client-Context.
a. If the test is unsuccessful, the OTA-Client sends the primitive INSTALLATION_REJ to the radio resource RR and returns to the state IDLE.
b. If the test is successful, the OTA-Client sends the primitive Installation_Cnf to the radio resource RR, starts the new software and returns to the state IDLE.
41. The radio resource RR receives the primitive INSTALLATION_CNF and sends on the associated control channel PACCH the protocol message Packet_Installation_Accept to the radio resource RR of the base station controller BSC and reconfigures the radio interface of the terminal MS.
42. The radio resource RR of the base station controller BSC receives the protocol message Packet_Installation_Accept, sends the primitive Installation_Cnf to the OTA-Client-Context, starts the procedure of release of the resources as provided by the Standard, and once said procedure has ended, it continues the hand-over procedure as provided by the Standard.
43. The OTA-Client-Context receives the primitive Installation_Cnf and returns to the state IDLE.

The procedure as disclosed in FIG. 19 refers to the operating software download procedure.

The procedure may be inserted, as a skilled person could appreciate in the inter-system hand-over procedure from GSM to UMTS for a circuit call, as defined by the Standard.

In particular, the insertion may be done at RR layer, between the reception from the MSC of the HANDOVER COMMAND message of the Base Station Subsystem Application Part (BSSAP) protocol and the transmission to the MS of the INTERSYSTEM TO UTRAN HANDOVER COMMAND message of the RR protocol.

The invention can be generalised to all possible inter-system hand-over procedures specified by the current Standards.

For example, the procedure may be inserted, as a skilled person could appreciate, in the inter-system hand-over procedure from UMTS to GSM for a circuit call, as defined by the Standard. In particular, the insertion may be done at Radio Resource Control (RRC) layer, between the reception from the MSC of the RELOCATION COMMAND message of the Radio Access Network Application Part (RANAP) protocol and the transmission to the User Equipment (UE) of the HANDOVER FROM UTRAN COMMAND message of the Radio Resource Control (RRC) protocol.

The invention can, also, be generalised to inter-system handover procedures not yet standardized, as for example inter-system handover procedures between International Mobile Telecommunication 2000 (IMT 2000) and WLAN or IEEE 802.16 or IEEE 802.20 systems.

As apparent to a skilled person, the invention allows, in case of a voice call, in particular a circuit type call, to perform the download of the operating software without interrupting the call; this is possible, in the case for example of GSM/GPRS, by allocating one or more packet channels, e.g. PDTCH GPRS channels, in parallel to the circuit type channel, e.g. TCH (Traffic Channel) GSM channel, used for the circuit communication.

This feature can allow to manage the priority between voice, data and software download.

The invention has been disclosed by keeping as a reference a GSM/GPRS system and the use of the radio channels of the above system, but, as a skilled person could appreciate, the invention may be applied by using, for example, a "universal" channel.

A possible example of using a "universal" channel could be of using an "universal" channel, as defined by literature, for the operating software download procedure from the OTA Server to the OTA Client.

In case of inter-system handover, the implementation of using a "universal" channel could foresee to maintain the active connection over the radio channels of the active system e.g. GSM/GPRS system, while the operating software download procedure from the OTA Server to the OTA Client is exploited simultaneously over the aforesaid "universal" channel, adopting for example the procedure disclosed in FIG. 18.

The "universal" channel may be used for the entire operating software download procedure or only a part of it, for example the transmission of the operating software from the OTA Server to the OTA Client.

In case a partial usage of the "universal" channel, the remaining part of the operating software download procedure may be implemented by using the radio channels of the active system.

The adoption of the "universal" channel allows to load in a more efficient way the radio resources related to active system, leaving them available to other users and to perform the operating software download procedure much more rapidly as the "universal" channel is a channel dedicated to this type of operation.

A further embodiment of the invention provides for the possibility of managing also a cell-reselection procedure, as known to a skilled person, when the terminal is, for example, in the IDLE state, between two systems, e.g. from GSM/GPRS to UMTS.

As previously remarked, the terms used for naming the primitives and related fields are purely indicative, as it is significant the corresponding definition as described.

This extension provides for the introduction of the following primitive between the OTA-Client and the radio resource RR at the terminal MS side:

Download Initiation Req: this message is sent from the OTA-Client to the radio resource RR at the terminal MS side.

The fields provided in this primitive, in the case of GSM/GPRS, are at least a set of the following ones:
OTA-Client ID: identifies the OTA-Client performing the request;

and of the following primitive between the OTA-Server and the radio resource RR at the base station controller BSC side:
Request Download Initiation Ind: this message is sent from the radio resource RR at the base station controller BSC side to the OA-Client.

The fields provided in the primitive, in the case of GSM/GPRS, are at least a set of the following ones:
OTA-Client ID: identifies the OTA-Client performing the request.

In the following it is indicated the behaviour of the context relative to the terminal MS of the OTA-Client-Context when receiving the primitive Request Download Initiation Ind:
if the state of the OTA-Client-Context is not IDLE, the primitive is ignored and the procedure does not continue;
the OTA-Client-Context goes to the state DOWNLOAD INITIATION;
the primitive Download Initiation Ind is sent to the OTA-Client while indicating the various possible downloads.

With reference to FIG. 19 it is illustrated the working of the download procedure of the operating software in case of cell-reselection, pointing out the interactions between the different entities present in the network. In the following, it is described, in detail, the working of the first phase of the procedure, since the remainder of the procedure itself is identical to the description of FIG. 18.

I. The OTA-Client and the OTA-Client-Context relative to the considered OTA-Client are in the state IDLE.

II. Upon reception of the cell-reselection command coming from the physical layer, the OTA-Client goes from the state IDLE to the state DOWNLOAD INITIATION, starts the timer T100 and sends the primitive Download_Initiation_Req wherein it specifies its own identifier to the radio resource RR. The radio resource RR locally stores the identifier of the OTA-Client.

III. The radio resource RR receives the primitive Download_Initiation_Req. The radio resource RR sends on the Packet, Random Access Channel PRACH the protocol message Packet_Channel_Request provided by the Standard wherein it specifies the request of downloading the operating software by the user and the identifier of the OTA-Channel. In case the GPRS configuration installed by the operator does not provide for the master channel constituted by the Packet Broadcast Control Channel PBCCH and by the Packet Common Control Channel PCCCH, the described procedure remains valid by mapping the first two messages of the procedure itself on the Random Access Channel RACH and on the Access Grant Channel AGCH of the GSM instead of the Packet Random Access Channel PRACH and the Packet Access Grant Channel PAGCH as described.

IV. The radio resource RR of the base station controller BSC receives the protocol message Packet_Channel_Request. Since this is recognised as a request of software download, it sends the primitive Request_Download_Initiation_Ind to the OTA-Client-Context wherein it is specified the identifier of the OTA-Client read by the received message.

V. The OTA-Server receives the primitive Request_Download_Initiation_nd and verifies in which state the OTA-Client-Context relative to the indicated OTA-Client is:
a. If the state is IDLE, the OTA-Client-Context goes to the state DOWNLOAD INITIATION, starts the timer T101 and sends the primitive Download_Initiation_Ind to the radio resource RR while indicating the requested download.
b. If the state is not IDLE, the message is ignored.

VI. The radio resource RR receives the primitive Download_Initiation_Ind. The radio resource RR requests to the radio resource management RRM the downlink resources necessary for making it possible to download the software:
  a. If the resources are available, the radio resource RR sends on the control channel PAGCH the protocol message Packet_Download_Request to the radio resource RR of the terminal MS wherein it indicates the channels PDCH on which the terminal shall perform the download, the RRBP and the requested download.
  b. If the resources are not available, the radio resource RR sends the primitive Download Nack Ind to the OTA-Client-Context.

VII. The radio resource RR of the terminal MS receives the protocol message Packet_Download_Request, configures the channels PDCH and sends the primitive Download_Request_Ind.

VIII. The OTA-Client receives the primitive Download_Request_Ind. If the terminal is able to perform the download, the OTA-Client sends the primitive Download_Ack_Ind wherein it specifies its own identifier The radio resource RR locally stores the identifier of the OTA-Client.

The procedure continues by performing the stages from the number 6 onwards of the procedure described with reference to the FIG. 18.

The architecture and method described according to present invention has been disclosed by keeping as a reference the access network of the GSM/GPRS system.

The invention may be also applied to the access network of UMTS, UTRAN (UMTS Terrestrial Radio Access Network) or any other access networks, e.g. WLAN, IEEE 802.16, IEEE 802.20.

For example, in case of UTRAN, the invention may be implemented inserting the OTA Client and the OTA Server and related procedures, primitives and protocol messages, at the RRC layer of the UMTS system.

The invention has been disclosed by using the access network and the corresponding protocol layers both in the network side and in the terminal side The invention may be also implemented by using the Core network and the corresponding protocol layers both in the network side and in the terminal side.

In this case, considering for example the Packet Switched Core Network of GSM/GPRS and UMTS systems, the invention may be implemented by inserting the OTA Client and the OTA Server and related procedures, primitives and protocol messages, at the GPRS Mobility Management (GMM) layer respectively of the terminal and of the Serving GPRS Support Node (SGSN) node of the Core Network.

More in particular, in the case of GSM/GPRS, the GPRS Mobility Management (GMM) layer is modified by introducing new protocol messages and related fields exchanged between the OTA-Server and the OTA-Client. The same approach could be applied for the UMTS system.

The invention has been disclosed by considering the downloading and activation of one operating software during an inter system handover procedure.

As could be apparent to a skilled person, the operating software may be downloaded and stored into the terminal, instead of being installed and run immediately.

According to this further embodiment, it is possible to install and run the operating software successively upon a request coming from the network or from the user. If the radio terminal UE/MS has enough memory and processing capability, the downloaded operating software can be stored and installed concurrently to the already existing and currently working system.

This option is useful for allowing a multi-mode working of the terminal UE/MS, in other words this option grants that the terminal is able to switch from one operating mode to another cone without the necessity to download the operating software.

In summary, thanks to the invention, it is possible to obtain at least the following advantages:
  the impact on the protocols and nodes existing in the second and third generation networks are minimised, since no nodes or physical interfaces are added to those already existing;
  the occupation of the radio resources is minimised as the signalling phase of the procedure employs the same signalling channels provided by the Standard while data channels are allocated only for the software download procedure;
  it is not necessary to wait for future UMTS releases based on IP, like those mentioned in the prior art, since the invention is based on the second and third generation networks already existing.

In particular, in the case of using the access network and the corresponding protocol layers both in the network side and in the terminal side, the network can fully control the software download procedure and the relative radio resources since the RR (Radio Resource) protocol has been integrated with some modifications that allow the terminal to download the new operating software, which may implement, for instance, a second generation cellular system, like GSM/GPRS, IS95, PDC (Phone Digital Cellular) or a third generation cellular system for instance belonging to the family IMT2000.

The invention claimed is:

1. A communication network being operative according to a communication system, said communication network including a radio resource protocol layer including first messages of a protocol stack corresponding to said communication system, the network comprising
  at least one re-configurable radio terminal user equipment/mobile station configured for managing exchange of information within said communication network by using said communications system; and
  at least one node of said communication network configured for managing exchange of information with said at least one re-configurable radio terminal user equipment/mobile station via a wireless over-the-air connection, said first messages being used for managing said wireless over-the-air connection;
  said at least one node comprising a server entity configured for using said radio resource protocol layer of said communication network and comprising a set of operating software modules configured for implementing at least one set of elements of said protocol stack, said set of elements being adapted to reconfigure said at least one re-configurable radio terminal user equipment/mobile station, wherein said set of operating software modules are suitable for reconfiguring at least in part said radio terminal user equipment/mobile station for a further communication system,
  said at least one re-configurable radio terminal user equipment/mobile station comprising a client entity configured for using a respective radio resource protocol layer corresponding to said protocol layer of said server entity, and said server and said client entities being provided with respective over the air software modules able to manage an over-the-air packet download procedure according to said communication system between said at least one re-configurable radio terminal user equipment/mobile station and said at least one node at said radio resource protocol layer in order to download at least one module of said set of operating software modules for configuring at least in part said at least one re-configurable radio terminal user equipment/mobile station for said further communication system, wherein said server entity and said client entity each includes at least one set of second messages comprising modifications solely to said radio resource protocol layer of said communication system to allow the terminal to download the new operating software, and wherein said set of second messages associated respectively with said server entity and with said client entity are configured for managing said over-the-air packet download procedure.

2. The network according to claim 1, comprising:
a radio access network and a core network; and wherein said radio resource protocol layer is a protocol layer of said core network.

3. The network according to claim 2, wherein said radio access network is operative in accordance with a second generation network.

4. The network according to claim 2, wherein said radio access network is operative in accordance with a third generation network.

5. The network according to claim 1, comprising
a radio access network and a core network; and wherein said radio resource protocol layer is a protocol layer of said radio access network.

6. The network according to claim 5, wherein
said radio access network comprises a radio controller, and wherein said radio resource protocol layer is a protocol layer of said radio controller.

7. The network according to claim 1, wherein said over-the-air connection is established through a universal channel of said communication network.

8. The network according to claim 1, wherein said over-the-air connection is established through a radio channel of said communication network.

9. The network according to claim 1, wherein said communications system is configured for managing priorities between a voice call, a data transmission and the download of said at least one module of said operating software modules.

10. The network according to claim 1, wherein said the over-the-air software modules are configured for downloading said at least one module of said operating software modules during a voice call.

11. The network according to claim 1, wherein
said radio terminal user equipment/mobile station contains the protocol stack of said communication system and contains only physical layer functionalities of a protocol stack for a further communication system sufficient to perform power measurements.

12. A method for configuring at least one re-configurable radio terminal user equipment/mobile station belonging to a communication network being operative according to a communication system, said communication network including a radio resource protocol layer including first messages of a protocol stack corresponding to said communication system, wherein said at least one re-configurable radio terminal user equipment/mobile station is configured for exchanging information with at least one node of said communication network via a wireless over-the-air connection, said at least one re-configurable radio station user equipment/mobile station includes a client entity configured for using said respective radio resource protocol layer, and said first messages are used for managing said wireless over-the-air connection, said method comprising:

associating with said at least one node of said communication network a server entity configured for using said radio resource protocol layer and comprising a set of operating software modules for implementing at least one set of elements of said protocol stack, said at least one set of elements of said protocol stack being adapted to reconfigure said at least one re-configurable radio terminal user equipment/mobile station, wherein said set of operating software modules are suitable for reconfiguring at least in part said radio terminal user equipment/mobile station for a further communication system;

establishing an over-the-air packet download procedure at said radio resource protocol layer; and downloading at least one module of said set of operating software modules from said server to said at least one re-configurable radio terminal user equipment/mobile station for configuring at least in part said radio terminal user equipment/mobile station for said further communication system by using said over-the-air packet download procedure according to said communication system, wherein said establishing an over-the-air packet download procedure comprises a set of protocol steps comprising for each of said protocol steps exchanging of second protocol messages with said at least one re-configurable radio terminal user equipment/mobile station, said second protocol messages comprising modifications solely to said radio resource protocol layer of said communication system to allow the terminal to download the new operating software.

13. The method according to claim 12, wherein said exchanging second protocol messages comprises exchanging messages comprising, respectively,
a set of the following fields:
a first field identifying the type of the message,
a second field identifying the radio terminal user equipment/mobile station to which the message refers; and
a third field containing data information.

14. The method according to claim 12, wherein said set of protocol steps comprises at least one of the following:
a) receiving a request for downloading said at least one operating software module;
b) authenticating said client;
c) checking the capability of said radio terminal user equipment/mobile station of accepting said at least one operating software module downloadable from said server;
d) providing information concerning the download options;
e) segmenting said at least one operating software module into blocks; and
f) transmitting said blocks from said server to said at least one radio terminal user equipment/mobile station.

15. The method according to claim 14, wherein said set of protocol steps comprises a step of:
monitoring the structure of said blocks downloaded to said radio terminal user equipment/mobile station.

16. The method according to claim 14, wherein said set of protocol steps comprises a step of:
managing a set of timers limiting the time allowed for performing the over-the-air connection.

17. The method according to claim 14, wherein said set of protocol steps comprises a step of:
- allocating for each protocol step at least a pair of timers, a first timer for monitoring the protocol steps performed by said radio terminal user equipment/mobile station and a second timer for monitoring the protocol steps performed by said server,
- each of said timers being started when one protocol step is started and being stopped when said one protocol step has been performed.

18. The method according to claim 14, wherein said authentication step is based on a "challenge-response" method.

19. The method according to claim 14, wherein, in said step of segmenting said at least one module into blocks, comprises the step of segmenting into blocks having a size of 1 to 2 kBytes, and wherein the step of transmitting said blocks comprises managing a window protocol wherein a window size matches with the size of the blocks into which said at least one operating software module has been segmented.

20. The method according to claim 14, wherein, before said set of elements are installed into said radio terminal user equipment/mobile station, a license is required.

21. The method according to claim 12, wherein said at least one operating software module, before being downloaded to said radio terminal user equipment/mobile station, is encrypted with a key.

22. The method according to claim 12, comprising the further step of downloading at least two sets of operating software modules for storage into said re-configurable radio terminal user equipment/mobile station.

23. A re-configurable radio terminal user equipment/mobile station configurable by carrying out a method for configuring at least one re-configurable radio terminal user equipment/mobile station belonging to a communication network being operative according to a communication system, said communication network including a radio resource protocol layer including first messages of a protocol stack corresponding to said communication system, wherein said at least one re-configurable radio terminal user equipment/mobile station is configured for exchanging information with at least one node of said communication network via a wireless over-the-air connection, said at least one re-configurable radio station user equipment/mobile station includes a client entity configured for using said respective radio resource protocol layer, and said first messages are used for managing said wireless over-the-air connection, said method comprising:
- associating with said at least one node of said communication network a server entity configured for using said radio resource protocol layer and comprising a set of operating software modules for implementing at least one set of elements of said protocol stack, said at least one set of elements of said protocol stack being adapted to reconfigure said at least one re-configurable radio terminal user equipment/mobile station, wherein said set of operating software modules are suitable for reconfiguring at least in part said radio terminal user equipment/mobile station for a further communication system;
- establishing an over-the-air packet download procedure at said radio resource protocol layer; and
- downloading at least one module of said set of operating software modules from said server to said at least one re-configurable radio terminal user equipment/mobile station for configuring at least in part said radio terminal user equipment/mobile station for said further communication system by using said over-the-air packet download procedure according to said communication system,
- wherein said establishing an over-the-air packet download procedure comprises a set of protocol steps comprising for each of said protocol steps exchanging of second protocol messages with said at least one re-configurable radio terminal user equipment/mobile station, said second protocol messages comprising modifications solely to said radio resource protocol layer of said communication system to allow the terminal to download the new operating software.

24. A network node comprising a server entity for configuring a re-configurable radio terminal user equipment/mobile station by carrying out a method for configuring at least one re-configurable radio terminal user equipment/mobile station belonging to a communication network being operative according to a communication system, said communication network including a radio resource protocol layer including first messages of a protocol stack corresponding to said communication system, wherein said at least one re-configurable radio terminal user equipment/mobile station is configured for exchanging information with at least one node of said communication network via a wireless over-the-air connection, said at least one re-configurable radio station user equipment/mobile station includes a client entity configured for using said respective radio resource protocol layer, and said first messages are used for managing said wireless over-the-air connection, said method comprising:
- associating with said at least one node of said communication network a server entity configured for using said radio resource protocol layer and comprising a set of operating software modules for implementing at least one set of elements of said protocol stack, said at least one set of elements of said protocol stack being adapted to reconfigure said at least one re-configurable radio terminal user equipment/mobile station, wherein said set of operating software modules are suitable for reconfiguring at least in part said radio terminal user equipment/mobile station for a further communication system;
- establishing an over-the-air packet download procedure at said radio resource protocol layer; and
- downloading at least one module of said set of operating software modules from said server to said at least one re-configurable radio terminal user equipment/mobile station for configuring at least in part said radio terminal user equipment/mobile station for said further communication system by using said over-the-air packet download procedure according to said communication system,
- wherein said establishing an over-the-air packet download procedure comprises a set of protocol steps comprising for each of said protocol steps exchanging of second protocol messages with said at least one re-configurable radio terminal user equipment/mobile station, said second protocol messages comprising modifications solely to said radio resource protocol layer of said communication system to allow the terminal to download the new operating software.

25. A non-transitory computer-readable medium containing instructions that, when executed by a computer, perform a method for configuring at least one re-configurable radio terminal user equipment/mobile station belonging to a communication network being operative according to a communication system, said communication network including a radio resource protocol layer including first messages of a protocol stack corresponding to said communication system, wherein said at least one re-configurable radio terminal user equipment/mobile station is configured for exchanging information with at least one node of said communication network via a wireless over-the-air connection, said at least one re-configurable radio station user equipment/mobile station includes a client entity configured for using said respective radio resource protocol layer, and said first messages are used for managing said wireless over-the-air connection, said method comprising:

associating with said at least one node of said communication network a server entity configured for using said radio resource protocol layer and comprising a set of operating software modules for implementing at least one set of elements of said protocol stack, said at least one set of elements of said protocol stack being adapted to reconfigure said at least one re-configurable radio terminal user equipment/mobile station, wherein said set of operating software modules are suitable for reconfiguring at least in part said radio terminal user equipment/mobile station for a further communication system;

establishing an over-the-air packet download procedure at said radio resource protocol layer; and downloading at least one module of said set of operating software modules from said server to said at least one re-configurable radio terminal user equipment/mobile station for configuring at least in part said radio terminal user equipment/mobile station for said further communication system by using said over-the-air packet download procedure according to said communication system, wherein said establishing an over-the-air packet download procedure comprises a set of protocol steps comprising for each of said protocol steps exchanging of second protocol messages with said at least one re-configurable radio terminal user equipment/mobile station, said second protocol messages comprising modifications solely to said radio resource protocol layer of said communication system to allow the terminal to download the new operating software.

* * * * *